United States Patent
Antila

(10) Patent No.: US 10,545,049 B2
(45) Date of Patent: Jan. 28, 2020

(54) METHOD FOR STABILIZING A SPECTROMETER USING SINGLE SPECTRAL NOTCH

(71) Applicant: Spectral Engines Oy, Helsinki (FI)

(72) Inventor: Jarkko Antila, Helsinki (FI)

(73) Assignee: Spectral Engines Oy, Helsinki (FI)

(*) Notice: Subject to any disclaimer, the term of this patent is extended or adjusted under 35 U.S.C. 154(b) by 0 days.

(21) Appl. No.: 15/321,757

(22) PCT Filed: Jun. 17, 2015

(86) PCT No.: PCT/FI2015/050444
§ 371 (c)(1),
(2) Date: Dec. 23, 2016

(87) PCT Pub. No.: WO2015/197914
PCT Pub. Date: Dec. 30, 2015

(65) Prior Publication Data
US 2017/0146401 A1 May 25, 2017

(30) Foreign Application Priority Data
Jun. 27, 2014 (FI) .................................. 2014 5627

(51) Int. Cl.
*G01J 3/26* (2006.01)
*G01J 3/02* (2006.01)
(Continued)

(52) U.S. Cl.
CPC .............. *G01J 3/26* (2013.01); *G01J 3/0227* (2013.01); *G01J 3/0286* (2013.01); *G01J 3/28* (2013.01);
(Continued)

(58) Field of Classification Search
CPC .... G01J 3/26; G01J 9/0246; G01J 3/45; G01J 3/0227; G01J 3/0286; G01J 2003/2879
See application file for complete search history.

(56) References Cited

U.S. PATENT DOCUMENTS 5,550,373 A   8/1996  Cole et al.
5,561,523 A * 10/1996  Blomberg ................. G01J 3/26
                                                356/454

(Continued)

FOREIGN PATENT DOCUMENTS

CN   102539342 A   7/2012
EP     0753733 A1  1/1997
(Continued)

*Primary Examiner* — Michael P LaPage
(74) *Attorney, Agent, or Firm* — Seppo Laine Oy

(57) ABSTRACT

A method for determining spectral calibration data ($\lambda_{cal}(S_d)$, $S_{d,cal}(\lambda)$) of a Fabry-Perot interferometer (100) comprises:
forming a spectral notch (NC2) by filtering input light (LB1) with a notch filter (60) such that the spectral notch (NC2) corresponds to a transmittance notch (NC1) of the notch filter (60),
measuring a spectral intensity distribution ($M(S_d)$) of the spectral notch (NC2) by varying the mirror gap ($d_{FP}$) of the Fabry-Perot interferometer (100), and by providing a control signal ($S_d$) indicative of the mirror gap ($d_{FP}$), and
determining the spectral calibration data ($\lambda_{cal}(S_d)$, $S_{d,cal}(\lambda)$) by matching the measured spectral intensity distribution ($M(S_d)$) with the spectral transmittance ($T_N(\lambda)$) of the notch filter (60).

14 Claims, 15 Drawing Sheets

(51) Int. Cl.
  *G01J 3/28* (2006.01)
  *G01J 3/45* (2006.01)
  *G01J 9/02* (2006.01)
  *G02B 5/20* (2006.01)
  *G02F 1/21* (2006.01)

(52) U.S. Cl.
  CPC ............... *G01J 3/45* (2013.01); *G01J 9/0246* (2013.01); *G01J 2003/2879* (2013.01); *G02B 5/20* (2013.01); *G02F 1/21* (2013.01)

(56) References Cited

U.S. PATENT DOCUMENTS

| | | | | |
|---|---|---|---|---|
| 5,808,786 | A * | 9/1998 | Shibuya | H01S 3/06758 359/341.33 |
| 5,838,437 | A * | 11/1998 | Miller | G01D 5/35383 250/227.14 |
| 5,892,582 | A * | 4/1999 | Bao | G01D 5/35383 250/227.27 |
| 6,504,616 | B1 * | 1/2003 | Haber | G01J 3/26 356/480 |
| 2007/0183781 | A1 * | 8/2007 | Zeng | G01J 3/26 398/85 |
| 2007/0206273 | A1 | 9/2007 | Ghera et al. | |
| 2012/0153158 | A1 | 6/2012 | Mikkelsen et al. | |
| 2014/0176729 | A1 | 6/2014 | Saari et al. | |

FOREIGN PATENT DOCUMENTS

| EP | 2720014 A1 | 4/2014 |
|---|---|---|
| WO | WO 2013167811 A1 | 11/2013 |

\* cited by examiner

METHOD FOR STABILIZING A SPECTROMETER USING SINGLE SPECTRAL NOTCH

FIELD

Some variations relate to spectral analysis of light.

BACKGROUND

The spectrum of an object may be measured by using spectrometer, which comprises a Fabry-Perot interferometer. The spectral scale of the spectrometer may be determined by calibration measurements, e.g. by using the excitation spectrum of a gas discharge lamp. The gas discharge lamp may typically contain e.g. argon, neon, xenon, krypton, hydrogen, or mercury.

SUMMARY

Some variations may relate to providing a spectrometer. Some variations may relate to providing a method for measuring a spectrum. Some variations may relate to providing a computer program for measuring a spectrum. Some variations may relate to providing a computer program product, which comprises computer program code for measuring a spectrum.

According to a first aspect, there is provided a method according to claim 1.

According to a second aspect, there is provided an apparatus according to claim 13.

Further aspects are defined in the other claims.

A method for determining spectral calibration data ($\lambda_{cal}$ ($S_d$), $S_{d,cal}(\lambda)$) of a Fabry-Perot interferometer (100) may comprise:
- forming a spectral notch (NC2) by filtering input light (LB1) with a notch filter (60) such that the spectral notch (NC2) corresponds to a transmittance notch (NC1) of the notch filter (60),
- measuring a spectral intensity distribution (M($S_d$)) of the spectral notch (NC2) by varying the mirror gap ($d_{FP}$) of the Fabry-Perot interferometer (100), and by providing a control signal ($S_d$) indicative of the mirror gap ($d_{FP}$), and
- determining the spectral calibration data ($\lambda_{cal}(S_d)$, $S_{d,cal}$ ($\lambda$)) by matching the measured spectral intensity distribution (M($S_d$)) with the spectral transmittance ($T_N$ ($\lambda$)) of the notch filter (60).

A method for verifying spectral calibration data ($\lambda_{cal}(S_d)$, $S_{d,cal}(\lambda)$) of a Fabry-Perot interferometer (100) may comprise:
- forming a spectral notch (NC2) by filtering input light (LB1) with a notch filter (60) such that the spectral notch (NC2) corresponds to a transmittance notch (NC1) of the notch filter (60),
- measuring a spectral intensity distribution (M($S_d$)) of the spectral notch (NC2) by varying the mirror gap ($d_{FP}$) of the Fabry-Perot interferometer (100), and by providing a control signal ($S_d$) indicative of the mirror gap ($d_{FP}$), and
- verifying the spectral calibration data ($\lambda_{cal}(S_d)$, $S_{d,cal}(\lambda)$) by checking whether the measured spectral intensity distribution (M($S_d$)) matches with the spectral transmittance ($T_N(\lambda)$) of the notch filter (60).

The spectrometer may comprise a Fabry-Perot interferometer and a detector for monitoring intensity of light transmitted through the Fabry-Perot interferometer. The spectral position of the Fabry-Perot interferometer may be scanned by varying the mirror gap of the Fabry-Perot interferometer. The spectrometer may provide a control signal indicative of the mirror gap. The control signal may be provided e.g. by a control unit, and the mirror gap may be controlled according to the control signal. Alternatively, the control signal may be provided by monitoring the mirror gap, e.g. by using a capacitive sensor. The control signal may be e.g. a digital control signal or an analog control signal. Each spectral position may be associated with a control signal value such that the relationship between the spectral positions and the control signal values may be expressed by calibration data.

The spectral scale of the interferometer may be calibrated in order to perform accurate spectral analysis. The spectral scale may be defined according to the calibration data. The calibration data may define the relationship between each spectral position of the transmission peak and the control signal value corresponding to said spectral position.

When monitoring an unknown spectrum, the spectrometer may be arranged to obtain intensity values from the detector as a function of the control signal. Measured intensity values may be associated with calibrated spectral positions based on the calibration data. The calibration data may comprise e.g. parameters of a regression function, which defines the relationship between each spectral position and the control signal value corresponding to said spectral position. The calibration data may be stored e.g. in a memory of the spectrometer, and/or in a database server.

The Fabry-Perot interferometer comprises a first semi-transparent mirror and a second semi-transparent mirror, which are arranged to form an optical cavity of the interferometer. The Fabry-Perot interferometer may provide a narrow transmission peak, which has adjustable spectral position, and which can be used for spectral analysis. The spectral position of the transmission peak may be changed by changing the distance between the mirrors. The distance between mirrors may be called e.g. as the mirror gap or as the mirror spacing. The Fabry-Perot interferometer may have an adjustable mirror gap.

The spectral position of the transmittance peak may be changed according to a control signal. The control signal may be e.g. a voltage signal, which is applied to electrodes of an electrostatic actuator in order to change the mirror gap of the Fabry-Perot interferometer. The control signal may be e.g. a voltage signal, which is applied to a piezoelectric actuator of the Fabry-Perot interferometer in order to change the mirror gap of the Fabry-Perot interferometer. Yet, the control signal may be provided by using a capacitive sensor, which is arranged to monitor the mirror gap of the Fabry-Perot interferometer.

The relationship between each spectral position of the transmission peak and the control signal value corresponding to said spectral position may depend e.g. on the operating temperature of the Fabry-Perot interferometer. Said relationship may depend on the operating life (i.e. age) of the interferometer. Said relationship may be substantially changed e.g. if the interferometer experiences an impact (i.e. an acceleration shock). Said relationship may be substantially changed also due to chemical corrosion.

The spectral scale of the interferometer may be stabilized by using an optical notch filter. The relationship between each spectral position and the control signal value corresponding to said spectral position may be determined and/or verified based on a spectral notch formed by using the optical notch filter. The notch filter may be placed in the optical path of the spectrometer. In particular, the notch filter may be integrated with a bandwidth-limiting filter of the spectrometer so that using the notch filter does not significantly increase the mechanical complexity of the spectrometer. The notch filter and the bandwidth-limiting filter may be implemented e.g. by using dielectric multilayer coatings deposited on a substrate. The combination of the notch filter and the bandwidth-limiting filter may be implemented as a substantially monolithic structure, which may be mechanically stable. In an embodiment, the notch filter may also be used as a mechanically protective input window for the spectrometer. The notch filter may provide a simple and highly stabile spectral reference for stabilizing the spectral scale of the spectrometer. The spectral scale of the spectrometer may be stabilized by using the notch filter.

The notch filter may be arranged to form a spectral notch. The Fabry-Perot interferometer may be used for measuring the spectral intensity distribution of the spectral notch. The spectral calibration data of the interferometer may be determined by matching the measured distribution with the transmittance notch of the notch filter. The matching may be performed e.g. by using cross correlation, and/or by associating a control signal value with predetermined a predetermined spectral position. The measured distribution may be matched with the spectral transmittance e.g. by using cross-correlation. The spectral calibration data may be checked by using cross-correlation analysis. The spectral calibration data of the interferometer may be checked by comparing the measured distribution with the spectral transmittance of the notch filter.

The spectral calibration data may be determined by matching spectral features of the measured spectral distribution with spectral features of the spectral transmittance of the notch filter.

The spectral calibration data may be determined by matching the spectral notch of the measured spectral distribution with the notch of the spectral transmittance of the notch filter.

The spectral calibration data may be determined such that the measured spectral distribution matches with the spectral transmittance of the notch filter, when the relation between the control signal and the spectral position is determined by using said spectral calibration data.

The spectral calibration data may be determined such that spectral features of the measured spectral distribution substantially coincide with spectral features of the spectral transmittance of the notch filter, when the relation between the control signal and the spectral position is determined using said spectral calibration data.

The spectral calibration data may be determined such that the spectral position of a first spectral feature of the measured spectral distribution substantially coincides with the spectral position of a first spectral feature of the spectral transmittance of the notch filter, when the relation between the control signal and the spectral position is determined using said spectral calibration data.

Input light may be filtered by the notch filter in order to provide a filtered spectrum, which has a spectral notch. The spectral position of the spectral notch may be highly stable. The spectral position of the spectral notch may be substantially independent of air pressure, variations of humidity, ageing, and/or corrosion. The spectral position of the spectral notch may remain unaltered even after the spectrometer has experienced a mechanical impact.

The notch filter may be implemented as a highly stable monolithic structure. In particular, the notch filter and the bandwidth-limiting filter may be implemented by using a structure, which is mechanically and thermally stable.

The spectrometer may permanently comprise the notch filter in order to enable on-line stabilization and/or verification of the spectral scale. In an embodiment, the spectral scale of the spectrometer may be determined and/or verified even when measuring an unknown spectrum of an object.

Spectral stability may be a key parameter when analyzing spectra by using the spectrometer. By using the notch filter, the spectral scale may be stabilized even when the spectrometer is used in a harsh environment. A highly stable spectrometer may be provided by combining the scanning Fabry-Perot interferometer with the notch filter. The notch filter may be easily integrated in an on-line measurement system.

The operation of the notch filter as such does not require operating power. However, optional monitoring the temperature of the notch filter may sometimes require a very low power. The notch filter may have a highly reproducible thermal drift. In an embodiment, the spectral calibration data may comprise information about the effect of the operating temperature of the notch filter on the spectral scale. The operating temperature of the notch filter may be monitored, and the spectral scale of the interferometer may be determined according to the operating temperature of the notch filter.

The calibration of the spectrometer may optionally comprise performing intensity calibration in addition to performing the spectral calibration. The intensity values of the spectrometer may be calibrated e.g. by measuring spectral intensity values of light obtained from a blackbody radiator or a tungsten ribbon lamp, and by comparing the measured spectral intensity values with intensity calibration data associated with said radiator or lamp.

The spectrometer may be used for analyzing spectra of samples e.g. in the pharmaceutical industry, in the beverage industry, in the food industry, or in petrochemical industry. The sample may comprise e.g. food, beverage, medicament, or a substance for producing a medicament.

BRIEF DESCRIPTION OF THE DRAWINGS

In the following examples, several variations will be described in more detail with reference to the appended drawings, in which.

DETAILED DESCRIPTION

Figure 1:
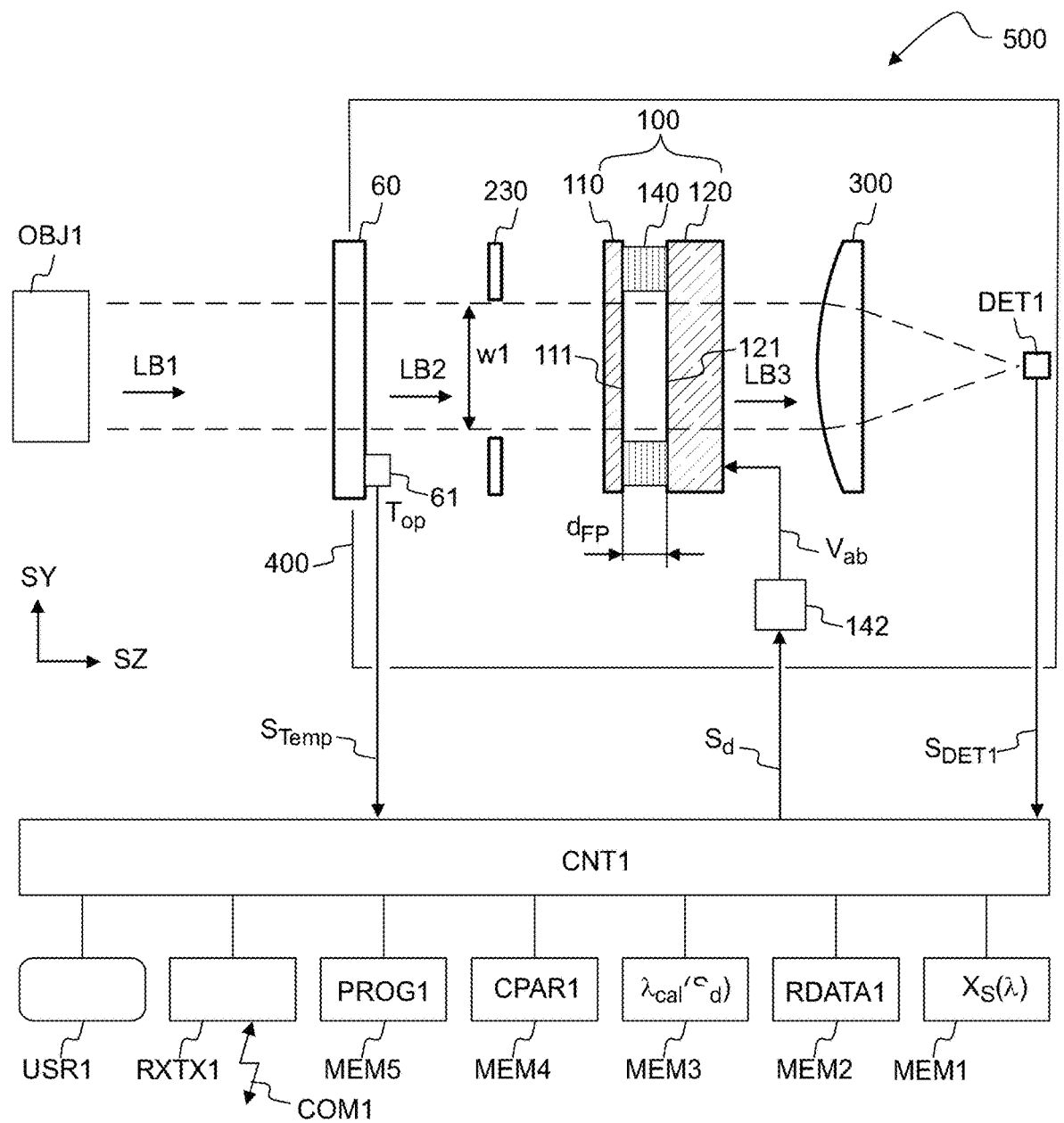
FIG. 1 shows, by way of example, a spectrometer, which comprises a Fabry-Perot interferometer.

Referring to FIG. 1, a spectrometer 500 may comprise a Fabry-Perot interferometer 100, a detector DET1, and a notch filter 60.

An object OBJ1 may reflect, emit and/or transmit light LB1. The light LB1 may be coupled into the spectrometer 500 in order to monitor the spectrum of the light LB1. In particular, the notch filter 60 may be used as an input window, and the light LB1 may be coupled into the spectrometer 500 through the notch filter 60. The spectrometer 500 may optionally comprise a housing 400. The spectrometer 500 may comprise a protective housing 400. The housing 400 may be arranged to mechanically protect the interferometer 100.

In an embodiment, the housing 400 may be hermetic. The housing 400 may be filled with a gas, which has a predetermined composition. For example, the housing 400 may be filled with nitrogen or argon.

The spectrometer 500 may be used e.g. for monitoring spectral properties of light LB1 received from the object OBJ1. The light LB1 may be e.g. reflected by the object, transmitted through the object, scattered by the object and/or emitted from the object.

The Fabry-Perot interferometer 100 comprises a first semi-transparent mirror 110 and a second semi-transparent mirror 120. The distance between the first mirror 110 and the second mirror 120 is equal to a mirror gap $d_{FP}$.

The mirror gap $d_{FP}$ is adjustable. The first mirror 110 may have a solid-gas interface 111, and the second mirror 121 may have a solid-gas interface 121. The mirror gap $d_{FP}$ may denote the distance between the interfaces 111 and 121. The Fabry-Perot interferometer 100 may provide a transmission peak $P_{FP,k}$ (FIG. 2a), wherein the spectral position of the transmission peak $P_{FP,k}$ may depend on the mirror gap $d_{FP}$. The spectral position of the transmission peak $P_{FP,k}$ may be changed by changing the mirror spacing $d_{FP}$. The transmission peak $P_{FP,k}$ may also be called as the passband of the Fabry-Perot interferometer 100.

The filter 60 may provide filtered light LB2 by filtering the light LB1 received from the object OBJ1.

The Fabry-Perot interferometer 100 may form transmitted light LB3 by transmitting a portion of the filtered light LB2 to the detector DET1. The interferometer 100 may be optically coupled to the detector DET1. The transmitted light LB3 may at least partly impinge on the detector DET1.

Figure 6:
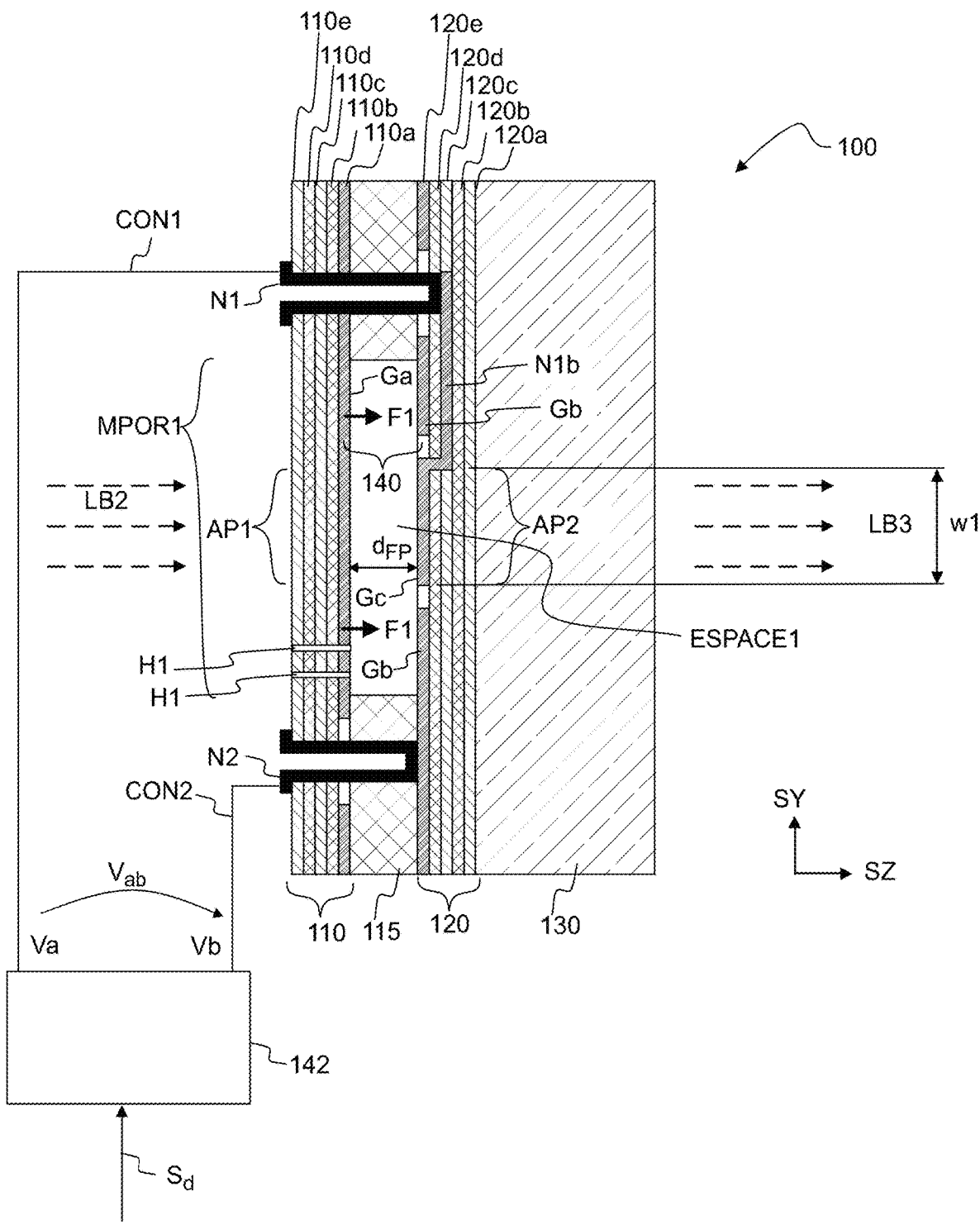

An actuator 140 may be arranged to move the first mirror 110 with respect to the second mirror 120. The actuator 140 may be e.g. electrostatic actuator (FIG. 6). The actuator 140 may be e.g. a piezoelectric actuator. The mirrors 110, 120 may be substantially planar and substantially parallel to each other. The mirrors 110, 120 may be flat. The semi-transparent mirrors 110, 120 may comprise e.g. a metallic reflective layer and/or a reflective dielectric multilayer. One of the mirrors 110, 120 may be attached to a frame, and the other mirror may be moved by one or more actuators 140.

In an embodiment, the object OBJ1 may be a real or virtual object. For example, the object OBJ1 may be a tangible piece of material. The object OBJ1 may be a real object. The object OBJ1 may be e.g. in solid, liquid, or gaseous form. The object OBJ1 may comprise a sample. The object OBJ1 may a combination of a cuvette and a chemical substance contained in the cuvette. The object OBJ1 may be e.g. a plant (e.g. tree or a flower), a combustion flame, or an oil spill floating on water. The object may be e.g. the sun or a star observed through a layer of absorbing gas. The object OBJ1 may be a display screen, which emits or reflects light of an image. The object OBJ1 may be an optical image formed by another optical device. The object OBJ1 may also be called as a target. The light LB1 may be provided e.g. directly from a light source, by reflecting light obtained from a light source, by transmitting light obtained from a light source. The light source may comprise e.g. an incandescent lamp, a blackbody radiator, an infrared light emitting glowbar, a tungsten halogen lamp, a fluorescent lamp, or a light emitting diode.

The spectrometer 500 may comprise a control unit CNT1. The control unit may comprise one or more data processors. The spectrometer may provide a control signal $S_d$ indicative of the mirror gap $d_{FP}$. In an embodiment, the control unit CNT1 may provide the control signal $S_d$, and the mirror gap may be controlled according to the control signal $S_d$. For example, the spectrometer 500 may comprise a driving unit 142, which may be arranged to convert a digital control signal $S_d$ into a voltage signal $V_{ab}$. The voltage signal $V_{ab}$ may be coupled e.g. to an electrostatic actuator or to a piezoelectric actuator in order to adjust the mirror gap $d_{FP}$. The driver unit 142 may convert a digital signal $S_d$ into an analog signal $V_{ab}$ suitable for driving the actuator 140.

Figure 7:
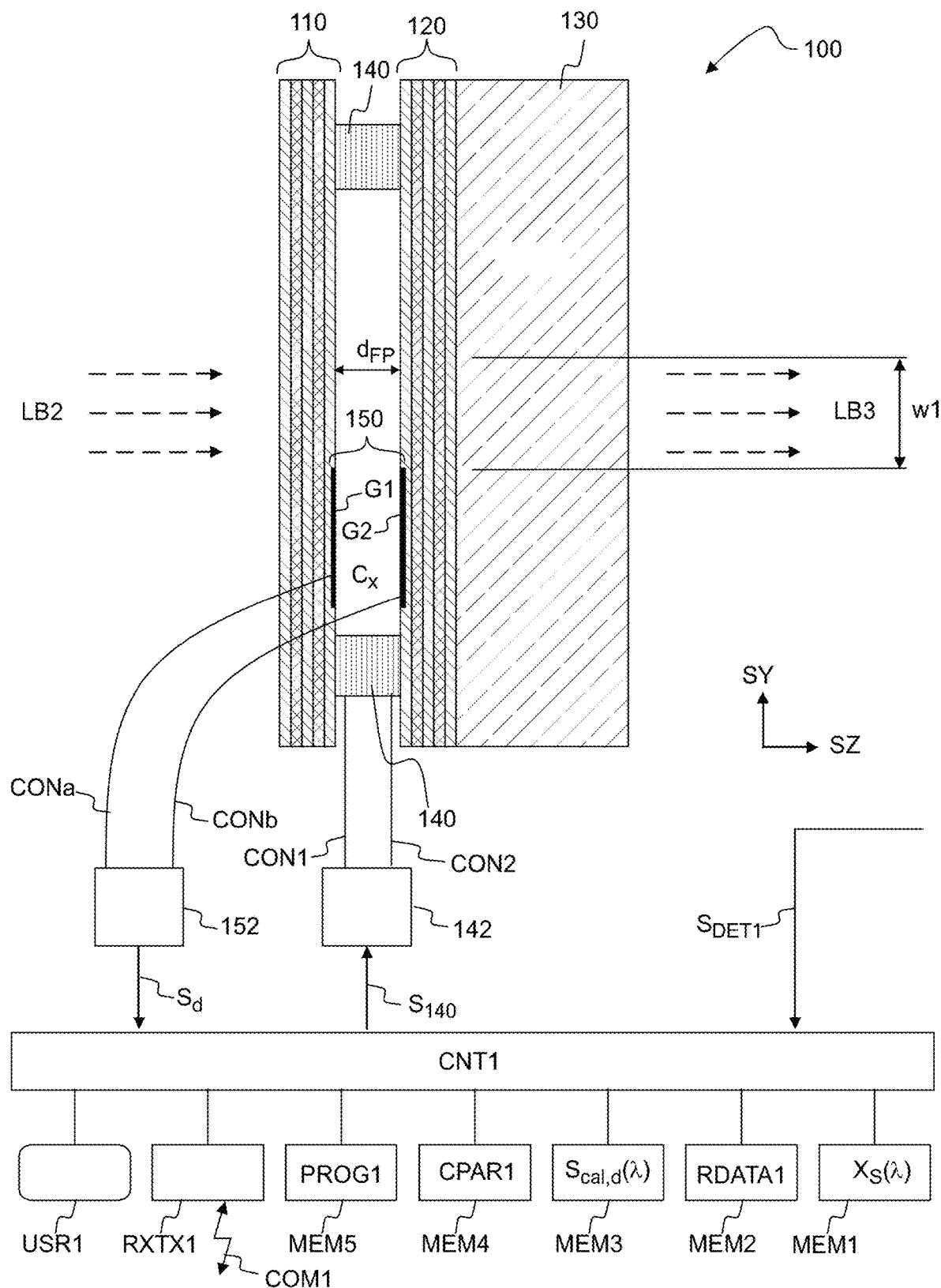
FIG. 7 shows, by way of example, a Fabry-Perot interferometer, which comprises a sensor for monitoring the mirror gap.

In an embodiment, the control signal $S_d$ may be provided by using a sensor. The interferometer may comprise e.g. a capacitive sensor 150 for monitoring the mirror gap $d_{FP}$ (FIG. 7). The capacitive sensor 150 may be arranged provide a control signal $S_d$ by monitoring the mirror gap $d_{FP}$. The control signal $S_d$ may be used e.g. as a feedback signal indicative of the mirror spacing $d_{FP}$.

In an embodiment, the control signal $S_d$ may be provided by monitoring a varying voltage signal $V_{ab}$ coupled to the interferometer 100. For example, the control signal $S_d$ may be proportional to the voltage signal $V_{ab}$ coupled to the actuator 140.

The spectrometer 500 may optionally comprise light concentrating optics 300 e.g. for concentrating light into the detector DET1. The optics 300 may comprise e.g. one or more refractive lenses and/or one or more reflective surfaces (e.g. a paraboloid reflector). The optics 300 may be positioned e.g. between the interferometer 100 and the detector DET1. One or more components of the optics 300 may also be positioned before the interferometer 100. In an embodiment, the notch filter 60 may also be positioned between the interferometer 100 and the detector DET1.

The detector DET1 may be arranged to provide a detector signal $S_{DET1}$. The detector signal $S_{DET1}$ may be indicative of the intensity $I_3$ of light LB3 impinging on the detector DET1. The detector DET1 may convert the intensity $I_3$ of light LB3 impinging on the detector DET1 into detector signal values $S_{DET1}$.

The detector DET1 may be sensitive e.g. in the ultraviolet, visible and/or infrared region. The spectrometer 500 may be arranged to measure spectral intensities e.g. in the ultraviolet, visible and/or infrared region. The detector DET1 may be an imaging detector or a non-imaging detector. The detector DET1 may be selected according to the detection range of the spectrometer 500. For example, the detector may comprise e.g. a silicon photodiode. The detector may comprise a P-N junction. The detector may be a pyroelectric detector. The detector may be a bolometer. The detector may comprise a thermocouple. The detector may comprise a thermopile. The detector may be an Indium gallium arsenide (InGaAs) photodiode. The detector may be a germanium photodiode. The detector may be a photoconductive lead selenide (PbSe) detector. The detector may be a photoconductive Indium antimonide (InSb) detector. The detector may be a photovoltaic Indium arsenide (InAs) detector. The detector may be a photovoltaic Platinum silicide (PtSi) detector. The detector may be an Indium antimonide (InSb) photodiode. The detector may be a photoconductive Mercury cadmium telluride (MCT, HgCdTe) detector. The detector may be a photoconductive Mercury zinc telluride (MZT, HgZnTe) detector. The detector may be a pyroelectric Lithium tantalate (LiTaO3) detector. The detector may be a pyroelectric Triglycine sulfate (TGS and DTGS) detector. The detector may comprise one or more pixels of a CMOS detector array. The detector may comprise one or more pixels of a CCD detector array.

The spectrometer 500 may comprise a memory MEM4 for storing intensity calibration data CPAR1. One or more intensity values $I_1$ of the light LB1 may be determined from the detector signals $S_{DET1}$ by using the intensity calibration data CPAR1. The intensity calibration data CPAR1 may comprise e.g. one or more parameters of a regression function, which allows determining intensity values $I_1$ of the light LB1 from the detector signal values $S_{DET1}$.

Each determined intensity value $I_1$ may be associated with a value of the control signal $S_d$, and the determined intensity value $I_1$ may be associated with a spectral position $\lambda$ based on the control signal value $S_d$ and spectral calibration data $\lambda_{cal}(S_d)$.

Changes of operating temperature of the Fabry-Perot interferometer, operating life (i.e. age) of the interferometer, acceleration shocks and/or chemical corrosion may have an adverse effect on the spectral accuracy of the spectrometer, such that a spectral position determined by using the calibration data $\lambda_{cal}(S_d)$ may substantially deviate from the true spectral position. The stability of the spectral scale of the interferometer may be improved by using the notch filter 60.

The spectral calibration data $\lambda_{cal}(S_d)$ may be determined and/or verified by a method, which comprises:
forming a spectral notch (NC2) by filtering input light (LB1) with a notch filter (60) such that the spectral notch (NC2) corresponds to a transmittance notch (NC1) of the notch filter (60),
varying the mirror gap ($d_{FP}$) of a Fabry-Perot interferometer (100), and providing a control signal ($S_d$) indicative of the mirror gap ($d_{FP}$),
analyzing the intensity of light (LB3) transmitted through the notch filter (60) and the Fabry-Perot interferometer (100) in order to determine a first control signal value ($S_{N1}$) associated with a first mirror gap value ($d_{FP}$) when the transmission peak ($P_{FP,k}$) of the interferometer (100) substantially coincides with the spectral notch (NC2),
forming a first association ($\lambda_{N1},S_{N1}$) between the first control signal value ($S_{N1}$) and a first spectral position ($\lambda_{N1}$) of the transmittance notch (NC1), and
determining and/or verifying spectral calibration data ($\lambda_{cal}(S_d)$) of the interferometer (100) based on the first association ($\lambda_{N1},S_{N1}$).

A spectral distribution $M(S_d)$ may be measured by varying the mirror gap $d_{FP}$, and by recording the detector signal values $S_{DET1}$ as the function of the control signal $S_d$. The measured spectral distribution $M(S_d)$ may give detector signal values $S_{DET1}$ as the function of the control signal $S_d$. The intensity of the transmitted light LB3 may be analyzed by analyzing the distribution $M(S_d)$.

The first association ($\lambda_{N1},S_{N1}$) may also be called e.g. as the relationship between the first control signal value $S_{N1}$ and the first spectral position ($\lambda_{N1}$) of the transmittance notch (NC1). The first association ($\lambda_{N1},S_{N1}$) may be specified e.g. by a data pair ($\lambda_{N1},S_{N1}$). The spectrometer 500 may comprise a memory MEM2 for storing reference data RDATA1, which may define one or more associations ($\lambda_{N1},S_{N1}$). The data RDATA1 may comprise information about the spectral transmittance function $T_N(\lambda)$ of the notch filter.

Each measured detector signal value $S_{DET1}$ may be associated with a value of the control signal $S_d$, and the detector signal value $S_{DET1}$ may be associated with a spectral position $\lambda$ based on the control signal value $S_d$ and spectral calibration data $\lambda_{cal}(S_d)$.

The spectrometer 500 may comprise a memory MEM3 for storing spectral calibration data $\lambda_{cal}(S_d)$. The spectral calibration data $\lambda_{cal}(S_d)$ may comprise e.g. one or more parameters of a regression function, which allows determining the relationship between spectral positions $\lambda$ and the detector signal values $S_{DET1}$.

The spectrometer 500 may be arranged to determine spectral positions $\lambda$ from control signal values $S_d$ by using the spectral calibration data $\lambda_{cal}(S_d)$. The spectrometer 500 may comprise a memory MEM5 for storing a computer program PROG1. The computer program PROG1 may be configured, when executed by one or more data processors (e.g. CNT1), to determine spectral positions $\lambda$ from control signal values $S_d$ by using the spectral calibration data $\lambda_{cal}(S_d)$.

The spectrometer 500 may be arranged to obtain detector signal values $S_{DET1}$ from the detector DET1, and to determine intensity values $I_1$ from the detector signal values $S_{DET1}$ by using the intensity calibration data CPAR1. The computer program PROG1 may be configured, when executed by one or more data processors (e.g. CNT1), to obtain detector signal values $S_{DET1}$ from the detector DET1, and to determine intensity values $I_1$ from the detector signal values $S_{DET1}$ by using the intensity calibration data CPAR1.

The computer program PROG1 may be configured, when executed by one or more data processors (e.g. CNT1), to determine calibration data $\lambda_{cal}(S_d)$ by
varying the mirror gap ($d_{FP}$) of a Fabry-Perot interferometer (100),
providing a control signal ($S_d$) indicative of the mirror gap ($d_{FP}$), analyzing the intensity of light (LB3) transmitted through the notch filter (60) and the Fabry-Perot interferometer (100) in order to determine a first control signal value ($S_{N1}$) associated with a first mirror gap ($d_{FP}$) when the transmission peak ($P_{FP,k}$) of the interferometer (100) substantially coincides with the spectral notch (NC2), forming a first association ($\lambda_{N1}$, $S_{N1}$) between the first control signal value ($S_{N1}$) and a first spectral position ($\lambda_{N1}$) of the transmittance notch (NC1), and determining spectral calibration data ($\lambda_{cal}(S_d)$) of the interferometer (100) based on the first association ($\lambda_{N1}$, $S_{N1}$).

The spectrometer 500 may optionally comprise a memory MEM1 for storing spectral data $X_S(\lambda)$. The spectral data $X_S(\lambda)$ may comprise e.g. intensity values $I_1$ determined as a function $I_1(\lambda)$ of the spectral position $\lambda$. The spectral data $X_S(\lambda)$ may comprise e.g. detector signal values $S_{DET1}$ determined as a function $S_{DET1}(\lambda)$ of the spectral position $\lambda$. The spectral data $X_S(\lambda)$ may be calibrated measured spectral intensity distribution.

The spectrometer 500 may optionally comprise a user interface USR1 e.g. for displaying information and/or for receiving commands. The user interface USR1 may comprise e.g. a display, a keypad and/or a touch screen.

The spectrometer 500 may optionally comprise a communication unit RXTX1. The communication unit RXTX1 may transmit and/or receive a signal COM1 e.g. in order to receive commands, to receive calibration data $\lambda_{cal}(S_d)$, and/or to send spectral data $X_S(\lambda)$. The communication unit RXTX1 may be capable of wired and/or wireless communication. For example, the communication unit RXTX1 may be capable of communicating with a local wireless network (WLAN), with the Internet and/or with a mobile telephone network.

The spectrometer 500 may be implemented as a single physical unit or as a combination of separate units. In an embodiment, the interferometer 100, and the units CNT1, MEM1, MEM3, MEM4, MEM5, USR1, RXTX1 may be implemented in the same housing. In an embodiment, the spectrometer 500 may be arranged to communicate detector signals $S_{DET1}$ and control signals $S_d$ with a remote data processing unit, e.g. with a remote server. Spectral positions $\lambda$ may be determined from the control signals $S_d$ by the remote data processing unit.

The spectrometer 500 may comprise one or more bandwidth-limiting filters to define a detection band $\Delta\lambda_B$ of the spectrometer 500. The bandwidth-limiting filters may limit the spectral response of the detector DET1. The filters may be positioned before and/or after the interferometer 100. The bandwidth-limiting filters may be combined with the notch filter 60. In particular, the notch filter 60 may also be arranged to provide the bandwidth-limiting functionality.

The spectrometer 500 may optionally comprise e.g. a lens and/or an aperture 230, which is arranged to limit the divergence of the light LB3 transmitted through the interferometer 100 to the detector DET1, in order to provide a narrow bandwidth $\Delta\lambda_{FP}$ of the transmission peak $P_{FP,k}$. For example, the divergence of the light LB3 may be limited to be e.g. smaller than or equal to 10 degrees. When using light concentrating optics 300, the divergence of light LB3 contributing to the spectral measurement may also be limited by the dimensions of the detector DET1.

The spectrometer 500 may optionally comprise a temperature sensor 61 for monitoring the operating temperature $T_{op}$ of the notch filter 60. Information about the operating temperature $T_{op}$ may be communicated to the control unit CNT1 e.g. by using a temperature signal $S_{Temp}$.

SX, SY and SZ denote orthogonal directions. The light LB2 may propagate substantially in the direction SZ. The mirrors 110, 120 of the interferometer may be parallel to a plane defined by the directions SX and SY. Only the directions SZ and SY are shown in FIG. 1.

Figure 2A:
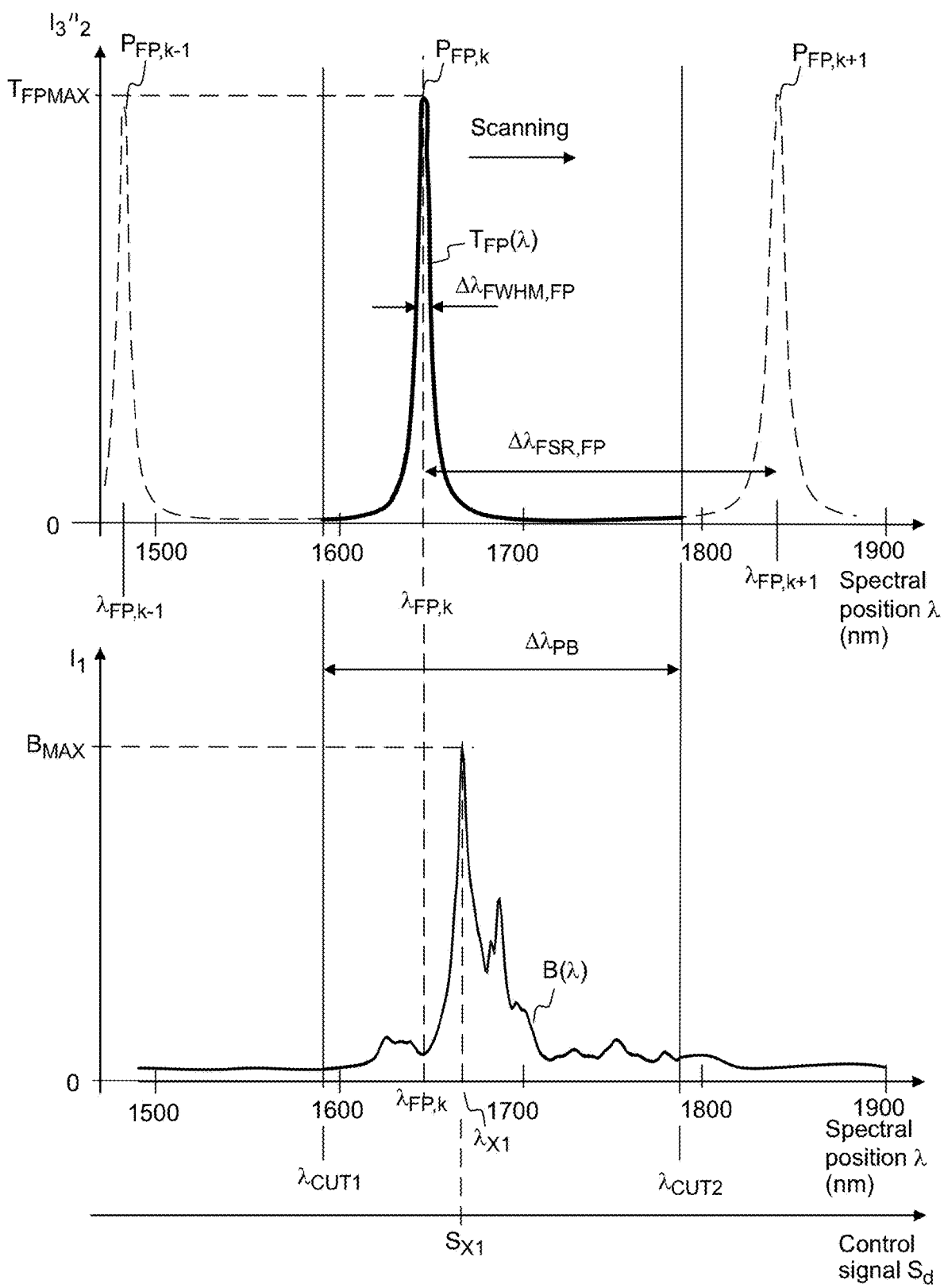
FIG. 2a shows, by way of example, the spectral transmittance of a Fabry-Perot interferometer and a spectrum of light received from an object.

FIG. 2a shows, by way of example, the spectral transmittance $T_{FP}(\lambda)$ of a Fabry-Perot interferometer 100, and the spectrum $B(\lambda)$ of light LB1 received from an object OBJ1. The spectral transmittance $T_{FP}(\lambda)$ of the interferometer 100 may have a plurality of transmission peaks $P_{FP,k-1}$, $P_{FP,k}$, $P_{FP,k+1}$, ... at respective spectral positions $\lambda_{FP,k-1}$, $\lambda_{FP,k}$, $\lambda_{FP,k+1}$. The spectrometer 500 may be arranged to detect light LB3 transmitted by a predetermined peak $P_{FP,k}$. The spectral position $\lambda_{FP,k}$ of the transmission peak $P_{FP,k}$ may be adjusted by changing the mirror gap $d_{FP}$.

The detection band $\Delta\lambda_{PB}$ of the spectrometer 500 may be defined e.g. by the filter 60. The spectrometer 500 may be arranged to operate such that the spectrometer 500 is substantially insensitive to spectral components, whose wavelengths are outside a detection range $\Delta\lambda_{PB}$. The filter 60 may be arranged to reject spectral components at wavelengths which are shorter than a first cut off value $\lambda_{CUT1}$, and the filter 60 may be arranged to reject spectral components at wavelengths which are longer than a second cut off value $\lambda_{CUT2}$. The filter 60 may be implemented e.g. by using dielectric multilayer coatings. The filter 60 may block spectral components at wavelengths outside the detection band $\Delta\lambda_{PB}$ from reaching the detector DET1. The cut-off limits $\lambda_{CUT1}$, $\lambda_{CUT2}$ may be selected such that only spectral components within the detection range $\Delta\lambda_{PB}$ may propagate to the detector DET1, depending on the spectral position $\lambda_{FP,k}$ of the transmission peak $P_{FP,k}$ of the interferometer 100. The cut-off limits $\lambda_{CUT1}$, $\lambda_{CUT2}$ may be selected such that spectral components overlapping the other transmission peaks $\lambda_{FP,k-1}$, $\lambda_{FP,k+1}$ do not propagate to the detector DET1. Adjacent peaks $P_{FP,k}$, $P_{FP,k+1}$ of the interferometer 100 are separated by the free spectral range $\Delta\lambda_{FSR,FP}$. The cut-off limits $\lambda_{CUT1}$, $\lambda_{CUT2}$ may be selected such that the detection range $\Delta\lambda_{PB}$ of the spectrometer 500 is narrower than the free spectral range $\lambda\Delta_{FSR,FP}$. Spectral components at wavelengths outside the detection range $\Delta\lambda_{PB}$ may also be rejected by utilizing spectral selectivity of the detector DET1 and/or another optical component of the spectrometer.

For example, the cut-off wavelengths $\lambda_{CUT1}$, $\lambda_{CUT2}$ of the detection range of the spectrometer 500 may be e.g. in the range of 780 nm to 15000 nm. In particular, the detection range of the spectrometer 500 may be in the near infrared range (780 nm to 3000 nm).

$I_2(\lambda)$ denotes spectral intensity of light LB2 impinging on the interferometer 100, and $I_3(\lambda)$ denotes spectral intensity of light LB3 transmitted through the interferometer 100. The transmittance $T_{FP}(\lambda)$ means the ratio $I_3(\lambda)/I_2(\lambda)$.

The lowermost curve of FIG. 2a shows an input spectrum $B(\lambda)$ of the light LB1 received from an object OBJ1. The input spectrum $B(\lambda)$ may also be called as the spectral intensity distribution $I_1(\lambda)$ of the input light LB1. The spectrum $B(\lambda)$ may have a maximum value $B_{MAX}$. The spectral transmittance of the peak $P_{FP,k}$ may have a maximum value $T_{FP,MAX}$. The maximum value $B_{MAX}$ of the input spectrum $B(\lambda)$ may be attained e.g. at a spectral position $\lambda_{X1}$.

When measuring intensity values $I_1$ of the spectrum $B(\lambda)$, the spectrometer 500 may provide detector signal values $S_{DET1}$ as a function $M(S_d)$ of the control signal values $S_d$. Analysis of said function may reveal e.g. that the maximum value $B_{MAX}$ is associated with a control signal value $S_{X1}$. The spectral position $\lambda_{X1}$ corresponding to the control signal value $S_{X1}$ may be subsequently determined by using the calibration data $\lambda_{cal}(S_d)$.

The calibration data $\lambda_{cal}(S_d)$ may be determined and/or verified by using the notch filter 60.

Figure 2B:
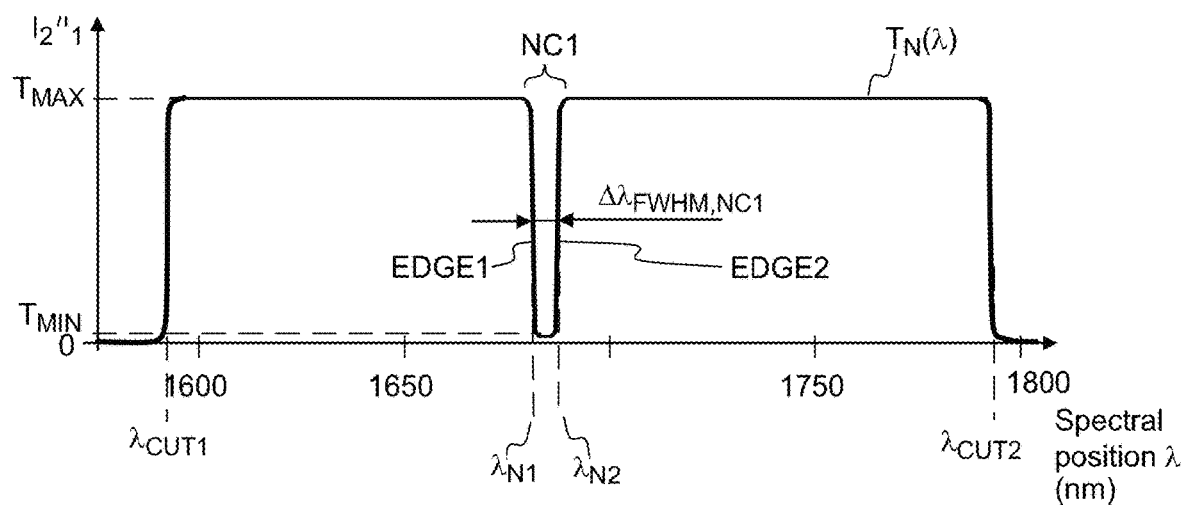
FIG. 2b shows the spectral transmittance of a notch filter.

FIG. 2b shows, by way of example, the spectral transmittance $T_N(\lambda)$ of the notch filter 60. The spectral transmittance $T_N(\lambda)$ may have a transmittance notch NC1. The transmittance notch NC1 may have a first edge EDGE1 at a spectral position $\lambda_{N1}$. The transmittance notch NC1 may have a second edge EDGE2 at a spectral position $\lambda_{N2}$. The minimum spectral transmittance $T_{MIN}$ between the positions $\lambda_{N1}$ and $\lambda_{N2}$ may be e.g. smaller than 50% of the maximum spectral transmittance $T_{MAX}$ of the notch filter 60. The minimum spectral transmittance $T_{MIN}$ between the positions $\lambda_{N1}$ and $\lambda_{N2}$ may be e.g. smaller than 10% of the maximum spectral transmittance $T_{MAX}$ of the notch filter 60.

The transmittance notch NC1 may have a spectral width $\Delta\lambda_{FWHM,NC1}$. The spectral width $\Delta\lambda_{FWHM,NC1}$ may be defined as the spectral separation between the positions $\lambda_{N1}$ and $\lambda_{N2}$. In this case, the acronym FWHM means full width at half minimum. The spectral positions $\lambda_{N1}$ and $\lambda_{N2}$ may indicate positions where the spectral transmittance $T_{NC1}(\lambda)$ reaches a value, which is equal to the value $0.5 \cdot (T_{MAX} + T_{MIN})$. The spectral width $\Delta\lambda_{FWHM,NC1}$ may denote the full spectral width defined by the spectral points where the spectral transmittance $T_{NC1}(\lambda)$ reaches a value, which is equal to the value $0.5 \cdot (T_{MAX} + T_{MIN})$.

The spectral width $\Delta\lambda_{FWHM,NC1}$ of the notch NC1 may be e.g. smaller than 10% of the spectral width of the detection range $\Delta\lambda_{PB}$ of the spectrometer 500. The spectral width $\Delta\lambda_{FWHM,NC1}$ of the notch NC1 may be e.g. smaller than 20 nm.

If the minimum spectral transmittance $T_{MIN}$ is very low, this may cause loss of spectral information. In that case, spectral information between the wavelengths $\lambda_{N1}$, $\lambda_{N2}$ may be lost.

Figure 2C:
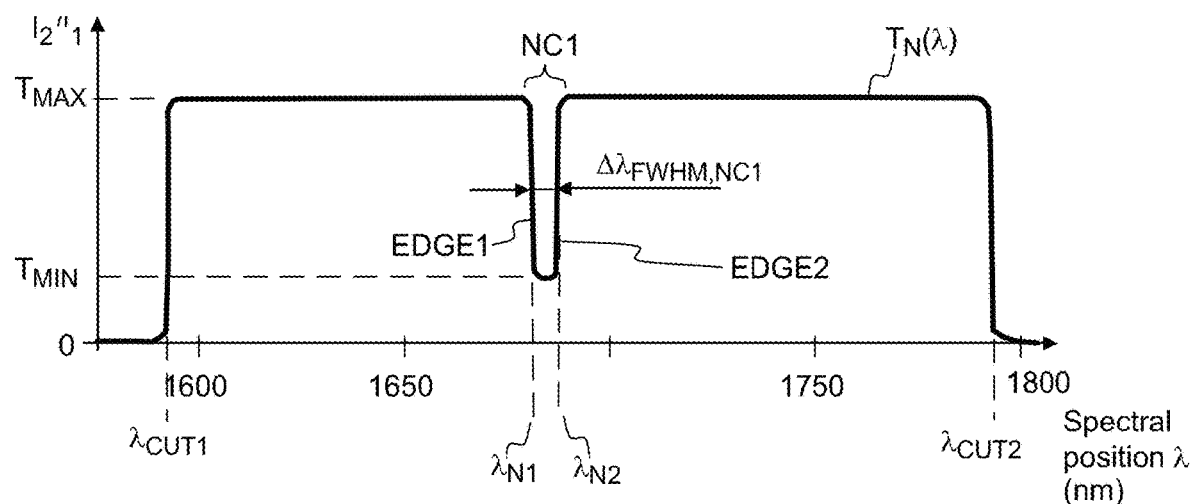
FIG. 2c shows the spectral transmittance of a notch filter.

FIG. 2c shows, by way of example, the spectral transmittance $T_N(\lambda)$ of a notch filter 60 where the minimum spectral transmittance $T_{MIN}$ is greater than or equal to 10% of the maximum spectral transmittance $T_{MAX}$. For example, the minimum spectral transmittance $T_{MIN}$ may be e.g. in the range of 10% to 80% of the maximum spectral transmittance $T_{MAX}$. Consequently, loss of spectral information may be avoided between the wavelengths $\lambda_{N1}$ and $\lambda_{N2}$.

Figure 2D:
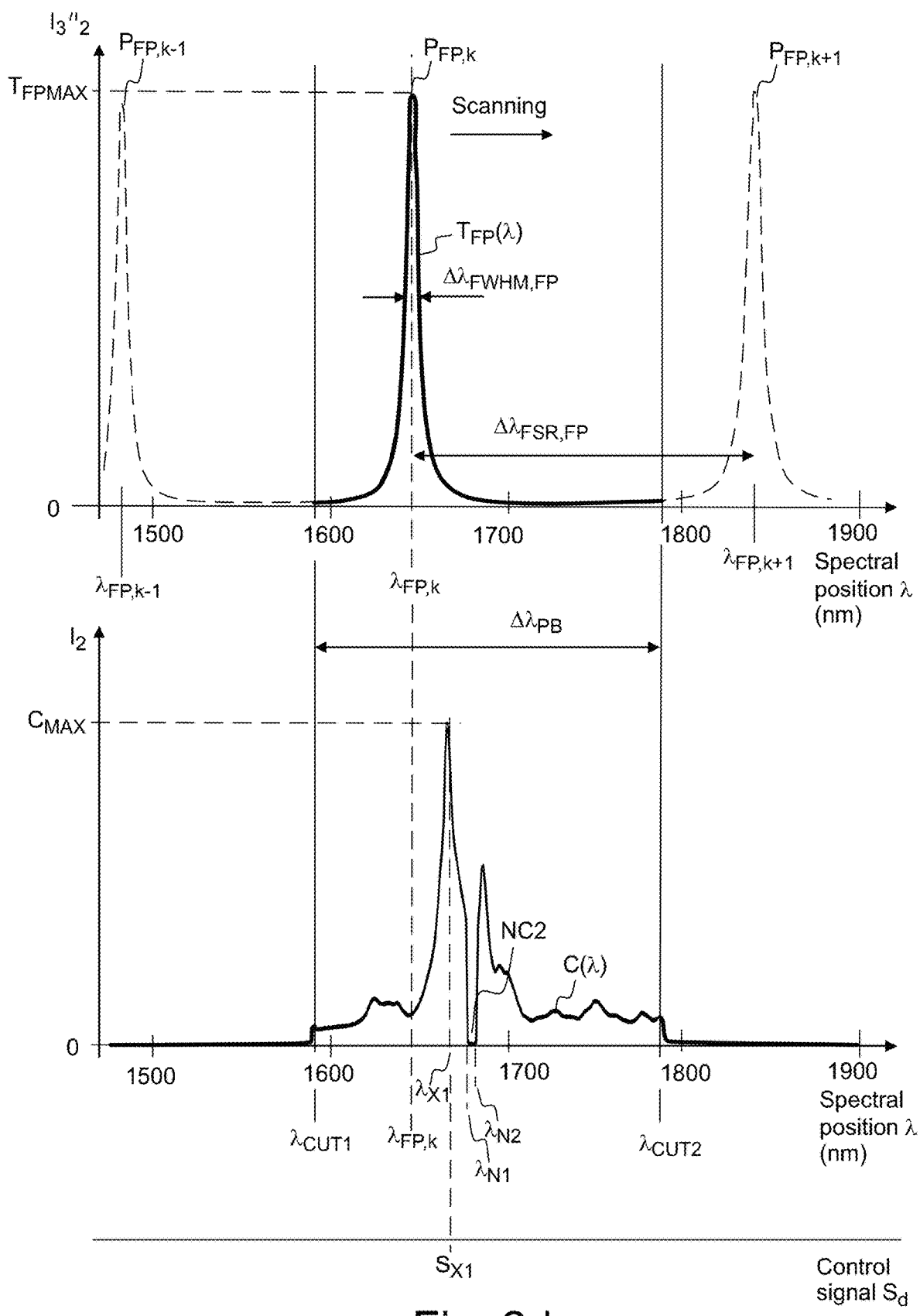
FIG. 2d shows by way of example, the spectral transmittance of a Fabry-Perot interferometer, and the spectrum of light filtered by the notch filter.

FIG. 2d shows, by way of example, a filtered spectrum $C(\lambda)$, which may be provided by filtering the input light LB1 of FIG. 2a with the notch filter 60 of FIG. 2b. The spectrum $C(\lambda)$ may have a maximum value $C_{MAX}$.

Figure 2E:
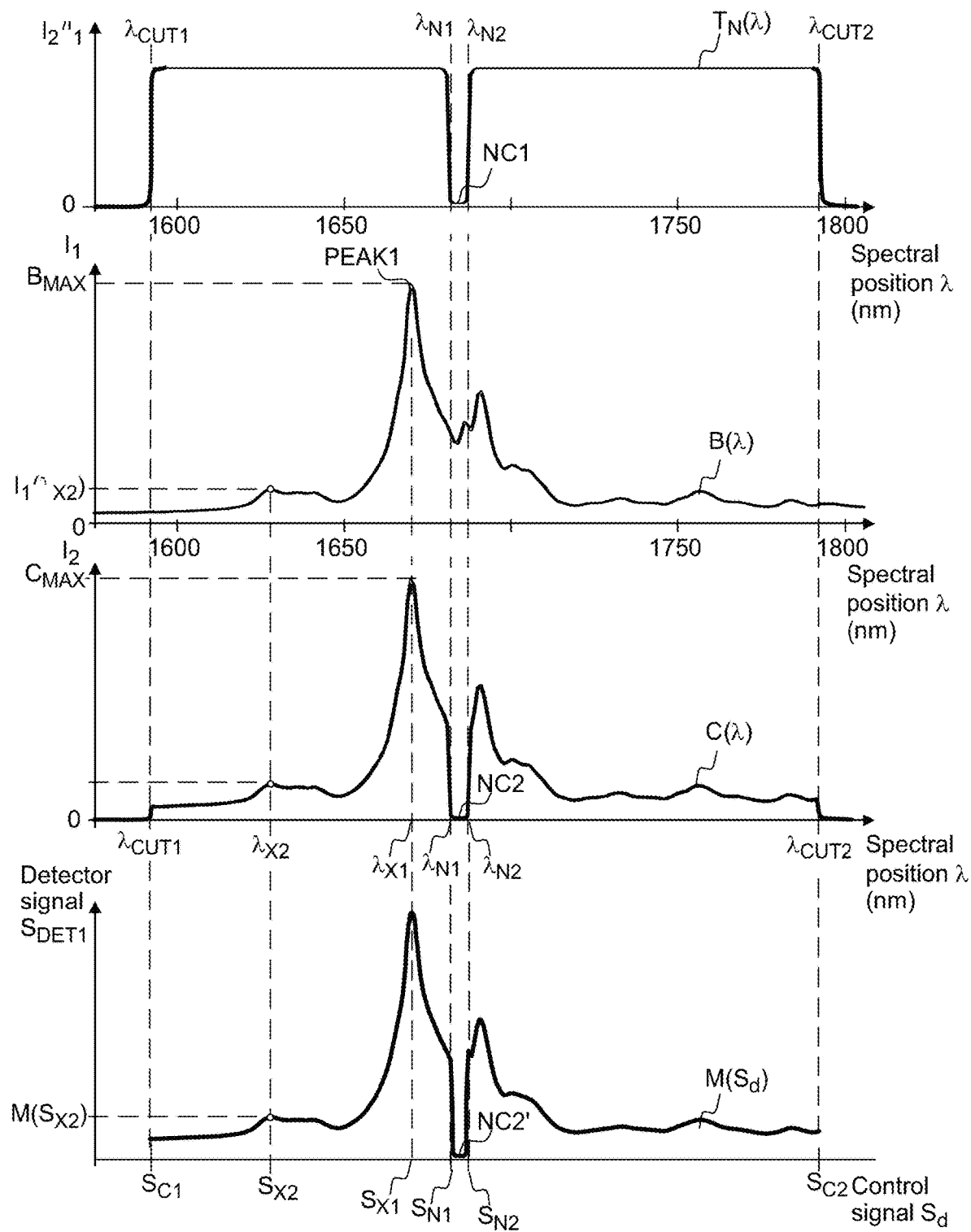
FIG. 2e shows, by way of example, forming a filtered spectrum by using the notch filter.

FIG. 2e illustrates the effect of the notch filter 60 on the spectrum of light LB2 transmitted through the notch filter 60. Input light LB1 impinging on the notch filter 60 may have an input spectrum $B(\lambda)$, and filtered light LB2 transmitted through the notch filter 60 may have a filtered spectrum $C(\lambda)$. The notch filter 60 may provide the filtered light LB2 by filtering the input light LB1. The filtered spectrum $C(\lambda)$ may be obtained by multiplying the input spectrum $B(\lambda)$ with the transmittance $T_N(\lambda)$ of the notch filter 60:

$$C(\lambda) = T_N(\kappa) \cdot B(\lambda) \quad (1)$$

The uppermost curve of FIG. 2e shows the spectral transmittance $T_N(\lambda)$ of the notch filter 60. The transmittance $T_N(\lambda)$ has a transmittance notch NC1, which may have a first spectral position $\lambda_{N1}$ and a second spectral position $\lambda_{N2}$. The positions $\lambda_{N1}$ and $\lambda_{N2}$ may be known at high accuracy.

The spectral position of the transmittance notch NC1 may also be specified e.g. by a single wavelength, which indicates the position of the center of the notch NC1.

The second curve from the top of FIG. 2e shows an input spectrum $B(\lambda)$ of input light LB1 received from an object OBJ1. The light LB1 may be e.g. reflected from the object OBJ1, emitted by the object OBJ1, and/or transmitted through the object OBJ1. The third curve from the top of FIG. 2e shows a filtered spectrum $C(\lambda)$, which is formed by filtering the input spectrum $B(\lambda)$ with the notch filter 60. The filtered spectrum may be expressed as a function $C(\lambda)$ of spectral position $\lambda$. The filtered spectrum $C(\lambda)$ may have a spectral notch NC2 at the positions $\lambda_{N1}$ and $\lambda_{N2}$. The spectral notch NC2 may be formed by multiplying the input spectrum $B(\lambda)$ with the transmittance $T_N(\lambda)$ in the vicinity of the transmittance notch NC1.

The lowermost curve of FIG. 2e shows a measured spectral intensity distribution $M(S_d)$. The distribution $M(S_d)$ may be measured by scanning over the filtered spectrum $C(\lambda)$. The distribution $M(S_d)$ may be measured by varying the mirror gap $d_{FP}$, and by recording the detector signal values $S_{DET1}$ as the function of the control signal $S_d$. The spectral notch NC2 of the filtered spectrum $C(\lambda)$ may be represented by the notch NC2' of the measured distribution $M(S_d)$. The measured spectral intensity distribution $M(S_d)$ of the filtered notch NC2 may have a notch NC2', which corresponds to the spectral notch NC2 of the filtered spectrum $C(\lambda)$.

The distribution $M(S_d)$ is measured by scanning the interferometer 100. Different parts of the spectrum may be scanned at different times. The distribution $M(S_d)$ may represent a time-averaged spectrum of the filtered light. The distribution $M(S_d)$ does not need to represent an instantaneous spectrum of light transmitted through the notch filter.

When checking/determining spectral calibration data, it is not necessary to scan over the whole spectral range from $\lambda_{CUT1}$ to $\lambda_{CUT2}$. When checking/determining spectral calibration data, it may be sufficient to scan over a spectral range, which is slightly wider than the notch NC2. When checking/determining spectral calibration data, the method may comprise measuring a spectral intensity distribution $M(S_d)$ of the spectral notch NC2.

The spectral position of the transmission peak $P_{FP,k}$ of the Fabry-Perot interferometer 100 may be scanned by varying the mirror gap $d_{FP}$. The control signal $S_d$ may be provided such that the control signal $S_d$ is indicative of the mirror gap $d_{FP}$. The spectral position of the transmission peak $P_{FP,k}$ of the Fabry-Perot interferometer 100 may be scanned by varying the value of the control signal $S_d$. The detector signal $S_{DET1}$ may be monitored as the function of the control signal $S_d$ in order to detect the edges of the notch NC2, NC2'.

The spectral position of the transmission peak $P_{FP,k}$ may coincide with a first edge of the spectral notch NC2 when the control signal $S_d$ of the Fabry-Perot interferometer 100 is equal to a first marker value $S_{N1}$. The spectral position of the transmission peak $P_{FP,k}$ may coincide with a second edge of the spectral notch NC2 when the control signal $S_d$ of the Fabry-Perot interferometer 100 is equal to a second marker value $S_{N2}$. The marker values $S_{N1}$, $S_{N2}$ may be determined by scanning the Fabry-Perot interferometer 100 and by analyzing the detector signal $S_{DET1}$. The marker values $S_{N1}$, $S_{N2}$ may be determined by varying the control signal $S_d$, measuring intensity values ($I_3$ or $S_{DET1}$) of the distribution $M(S_d)$ as a function of the control signal $S_d$, and by determining a control signal value $S_{N1}$ associated with the notch NC2' of the distribution $M(S_d)$.

In an embodiment, the marker values $S_{N1}$, $S_{N2}$ may be qualified only if the difference between said marker values $S_{N1}$, $S_{N2}$ substantially corresponds to the spectral width $\Delta\lambda_{FWHM,NC1}$ of the notch NC1.

The method may optionally comprise:
checking whether the first marker value $S_{N1}$ is a first predetermined range,
checking whether the second marker value $S_{N2}$ is a second predetermined range, and checking whether the difference between the second marker value $S_{N2}$ and the first marker value $S_{N1}$ is in a third predetermined range.

A calibrated spectral intensity distribution $M(S_{d,cal}(\lambda))$ may be subsequently determined from the measured distribution $M(S_d)$ by using a calibration function $S_{cal,d}(\lambda)$ or $\lambda_{cal}(S_d)$. The calibration function $S_{cal,d}(\lambda)$ and/or $\lambda_{cal}(S_d)$ may be determined and/or verified by matching the measured distribution $M(S_d)$ with the transmittance function $T_N(\lambda)$. The calibration function $S_{cal,d}(\lambda)$ and/or $\lambda_{cal}(S_d)$ may be determined and/or verified by using the marker values $S_{N1}$, $S_{N2}$ of the measured distribution $M(S_d)$ and the accurately known wavelengths $\lambda_{N1}$ and $\lambda_{N2}$ of the transmittance notch NC1 of the notch filter 60. The marker values $S_{N1}$, $S_{N2}$ may be used for determining the calibration function $S_{cal,d}(\lambda)$ and/or $\lambda_{cal}(S_d)$.

The limits $\lambda_{CUT1}$, $\lambda_{CUT2}$ of the detection band $\Delta\lambda PB$ may be optionally used to provide additional marker values $S_{C1}$, $S_{C2}$.

Data pairs $(\lambda_{N1}, S_{N1})$, $(\lambda_{N2}, S_{N2})$, $(\lambda_{CUT1}, S_{C1})$, $(\lambda_{CUT2}, S_{C2})$ for determining the calibration function $\lambda_{cal}(S_d)$ may be obtained by:

determining one or more marker values $S_{N1}$, $S_{N2}$, . . . from a measured distribution $M(S_d)$, and forming the data pairs $(\lambda_{N1}, S_{N1})$, $(\lambda_{N2}, S_{N2})$, $(\lambda_{CUT1}, S_{C1})$, $(\lambda_{CUT2}, S_{C2})$ by associating each marker value $S_{N1}$, $S_{N2}$ . . . with a corresponding spectral position $\lambda_{N1}$, $\lambda_{N2}$, $\lambda_{CUT1}$, $\lambda_{CUT2}$ defined by a spectral feature of the spectral transmittance $T_N(\lambda)$ of the filter 60.

The accuracy of a calibration function $\lambda_{cal}(S_d)$ may be improved and/or checked by using one or more of the data pairs $(\lambda_{N1}, S_{N1})$, $(\lambda_{N2}, S_{N2})$, $(\lambda_{CUT1}, S_{C1})$, $(\lambda_{CUT2}, S_{C2})$. A corrected calibration function $\lambda_{cal}(S_d)$ may be determined by using one or more of the data pairs $(\lambda_{N1}, S_{N1})$, $(\lambda_{N2}, S_{N2})$, $(\lambda_{CUT1}, S_{C1})$, $(\lambda_{CUT2}, S_{C2})$. The calibration function $\lambda_{cal}(S_d)$ may be stored e.g. in a memory MEM3 of the spectrometer.

The filtered spectrum $C(\lambda)$ of FIG. 2e may represent the spectrum of light LB2 transmitted through the notch filter 60. In an embodiment, a first part of the input light LB1 may be coupled to the interferometer via the notch filter 60, and a second part of the input light may be simultaneously coupled to the interferometer 100 without passing through the notch filter 60. For example, the filter 60 may cover less than 100% of the cross-section of the aperture of the interferometer 100. For example, the input light LB1 may be divided into a first part and a second part by using a beam splitter, wherein the first part may be coupled to the interferometer 100 through the filter 60, and the second part may be coupled to the interferometer 100 without passing through the filter 60. The spectrometer 500 may comprise e.g. optical fibers, prisms and/or mirrors for guiding the first part and/or the second part. Consequently, the spectrum $C(\lambda)$ may have a well-defined filtered notch NC2 without causing significant loss of intensity data between the wavelengths $\lambda_{N1}$, $\lambda_{N2}$. The filtering effect of the notch filter may be compensated e.g. by dividing the calibrated measured spectral intensity distribution $M(S_{d,cal}(\lambda))$ with the spectral transmittance $T_N(\lambda)$ of the notch filter 50.

Figure 2F:
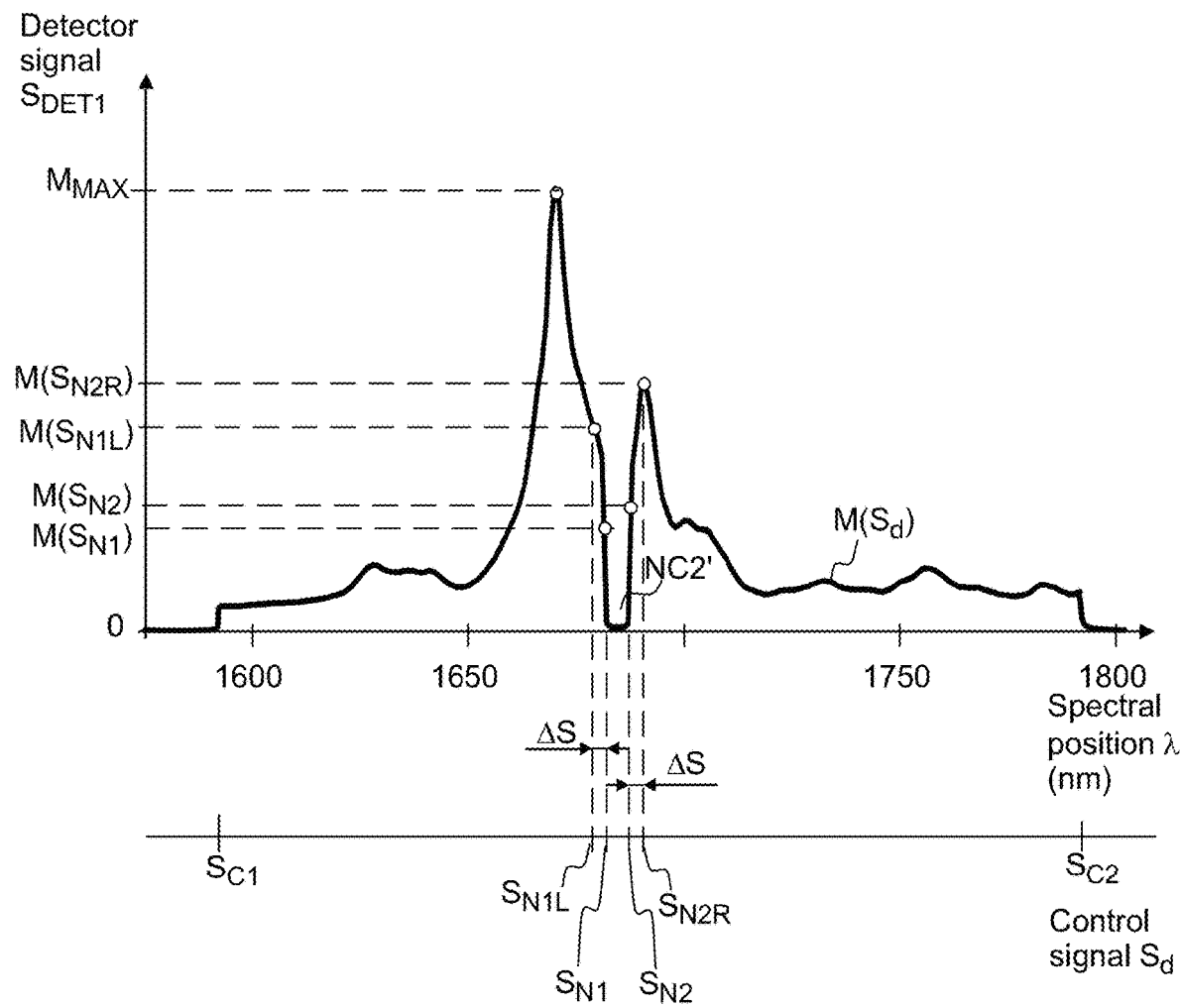
FIG. 2f shows, by way of example, auxiliary values for checking the validity of determined marker values.

Referring to FIG. 2f, the intensity of the input light LB1 may sometimes be too low for accurate determination of the marker values and/or the spectral features of the spectrum of the input light LB1 may disturb accurate determination of the marker values. The validity of a marker value $S_{N1}$, $S_{N2}$ may be checked before said marker value $S_{N1}$, $S_{N2}$ is used for determining the spectral scale. The method may comprise checking the validity of a marker value $S_{N1}$, $S_{N2}$. The method may comprise providing an indication when one or both marker values $S_{N1}$, $S_{N2}$ are invalid. In case of an invalid marker value $S_{N1}$, $S_{N2}$ the spectrometer may e.g. display a warning message, which indicates that the spectral scale could not be properly determined and/or verified.

The spectral intensity $I_2$ of the filtered light LB2 may be determined from the detector signal $S_{DET1}$. For example, the spectral intensity $I_2$ of the filtered light LB2 may be substantially proportional to the detector signal $S_{DET1}$. The spectral intensity $I_2$ may be determined from the detector signal $S_{DET1}$ e.g. by using intensity calibration data.

$M(S_{N1})$ may denote the magnitude of the detector signal $S_{DET1}$ when the control signal $S_d$ is equal to the first marker value $S_{N1}$. $M(S_{N2})$ may denote the magnitude of the detector signal $S_{DET1}$ when the control signal $S_d$ is equal to the second marker value $S_{N2}$. $M(S_{N1L})$ may denote the magnitude of the detector signal $S_{DET1}$ when the control signal $S_d$ is equal to a first auxiliary value $S_{N1L}$. $M(S_{N2R})$ may denote the magnitude of the detector signal $S_{DET1}$ when the control signal $S_d$ is equal to a second auxiliary value $S_{N2R}$. $M_{MAX}$ may denote the maximum value of the detector signal $S_{DET1}$.

The auxiliary value $S_{N1L}$ may be selected such that the value $M(S_{N1L})$ represents the filtered spectrum $I_2$ immediately outside the filtered notch NC2, on a first side of the notch NC2'. For example the difference $S_{N1} - S_{N1L}$ may be equal to a predetermined value $\Delta S$. The predetermined value $\Delta S$ may be e.g. in the range of 1% to 5% of the difference $S_{C2} - S_{C1}$.

The auxiliary value $S_{N2R}$ may be selected such that the value $M(S_{N2R})$ represents the filtered spectrum $I_2$ immediately outside the filtered notch NC2, on a second side of the notch NC2'. For example the difference $S_{N2R} - S_{N2}$ may be equal to a predetermined value $\Delta S$. The predetermined value $\Delta S$ may be e.g. in the range of 1% to 5% of the difference $S_{C2} - S_{C1}$.

The method may comprise performing one or more validity tests for determining the validity of a marker value $S_{N1}$. In an embodiment, a marker value $S_{N1}$ may be determined to be invalid if the marker value $S_{N1}$ is classified to be invalid according to at least one performed validity test. The marker value $S_{N1}$ may be determined to be valid if the marker value $S_{N1}$ is classified to be valid according to all performed validity tests. The marker value $S_{N1}$ may be classified to be valid according to a validity test when the marker value $S_{N1}$ is not classified to be invalid according to said test.

For example, the method may comprise performing a validity test where the first marker value $S_{N1}$ is classified to be invalid if the value $M(S_{N1L})$ is smaller than a predetermined value. The first marker value $S_{N1}$ may be classified to be invalid if the value $M(S_{N1L})$ is smaller than e.g. 5% of the maximum value $M_{MAX}$.

For example, the method may comprise performing a validity test where the second marker value $S_{N2}$ is classified to be invalid if the value $M(S_{N2R})$ is smaller than a predetermined value. The second marker value $S_{N2}$ may be classified to be invalid if the value $M(S_{N2R})$ is smaller than e.g. 5% of the maximum value $M_{MAX}$.

For example, the method may comprise performing a validity test where the first marker value $S_{N1}$ is classified to be invalid if the absolute value of the difference $M(S_{N2R}) - M(S_{N1L})$ is greater than a predetermined value. The first marker value $S_{N1}$ may be classified to be invalid if the absolute value of the difference $M(S_{N2R}) - M(S_{N1L})$ is greater than e.g. 10% of the maximum value $M_{MAX}$.

For example, the method may comprise performing a validity test where a marker value $S_{N1}$ is classified to be invalid if the difference $S_{N2}-S_{N1}$ is not within a predetermined range.

Figure 2G:
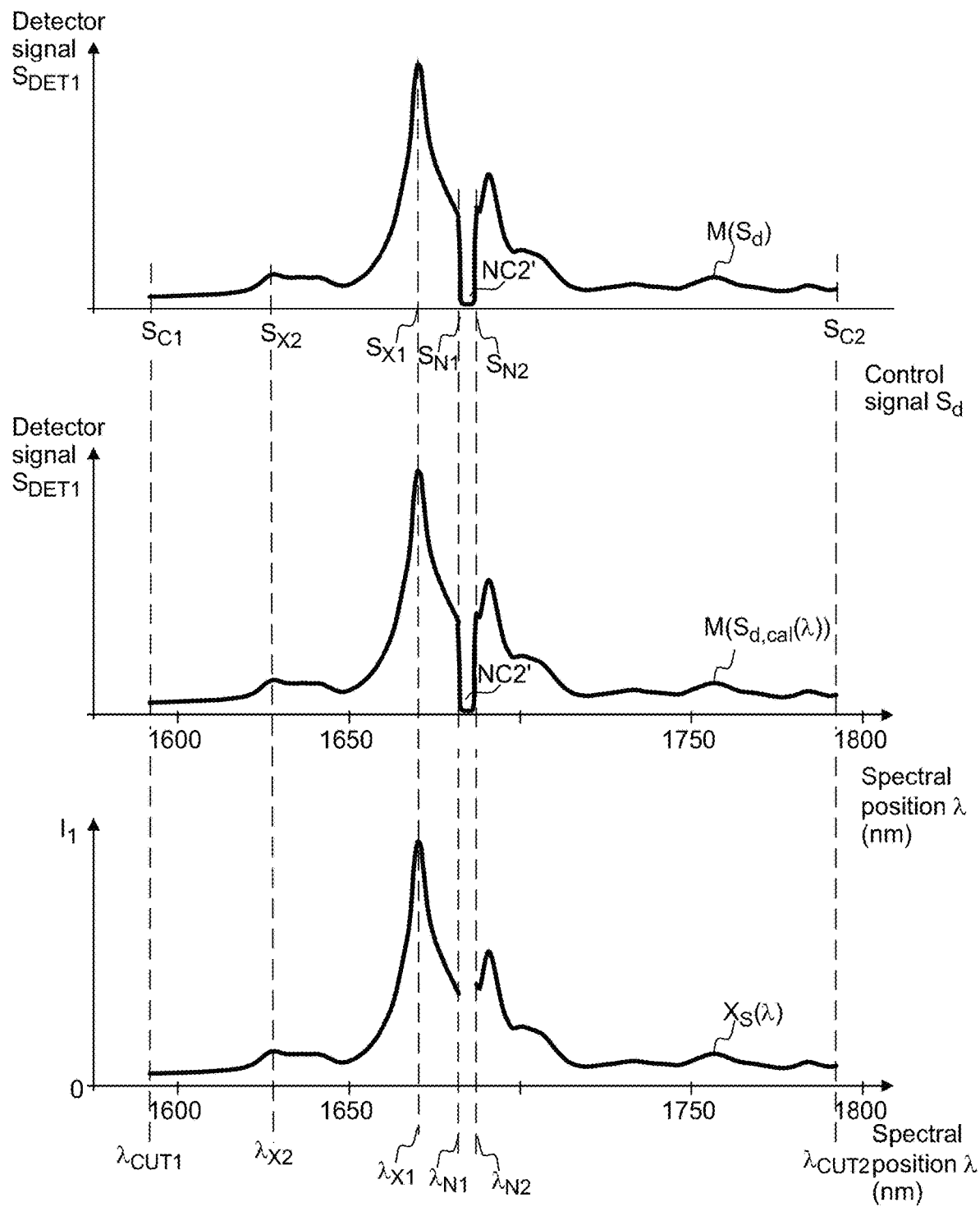
FIG. 2g shows, by way of example, obtaining a calibrated measured spectrum from the measured distribution of FIG. 2e.

FIG. 2g shows determining a calibrated measured spectrum $X_S(\lambda)$ from the measured spectral intensity distribution $M(S_d)$ of FIG. 2e. The uppermost curve of FIG. 2g shows the measured spectral intensity distribution $M(S_d)$, which may be obtained by varying the mirror gap $d_{FP}$, and by recording the detector signal values $S_{DET1}$ as the function of the control signal $S_d$. The second curve from the top of FIG. 2g shows a calibrated spectral intensity distribution $M(S_{d,cal}(\lambda))$ determined from the distribution $M(S_d)$ by using the calibration function $\lambda_{cal}(S_d)$ and/or $S_{d,cal}(\lambda)$. The spectrum $X_S(\lambda)$ may be determined from the measured distribution $M(S_{d,cal}(\lambda))$ by using the intensity calibration data CPAR1. Calibrated intensity values may be determined from the detector signal values $S_{DET1}$ by using the intensity calibration data CPAR1. The calibrated measured spectrum $X_S(\lambda)$ may be obtained by using the intensity calibration data CPAR1 to convert detector signal values into calibrated intensity values. The calibrated measured spectrum $X_S(\lambda)$ may represent the spectrum $B(\lambda)$ of the input light LB1. The calibrated measured spectrum $X_S(\lambda)$ of the input light LB1 may represent the spectrum of the object OBJ1.

Figure 3A:
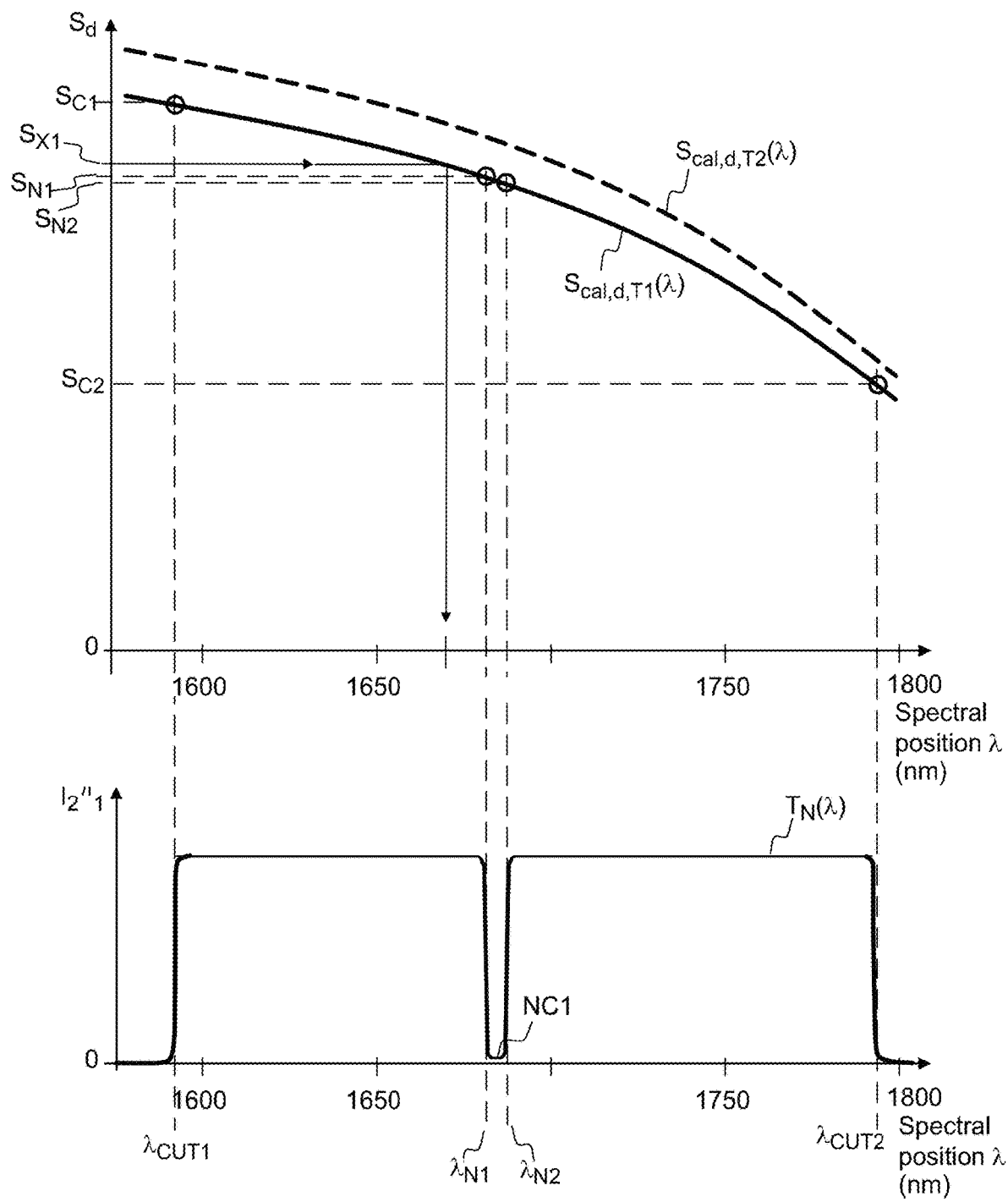
FIG. 3a shows, by way of example, the relationship between spectral positions and control signal values at a first operating temperature of the interferometer and at a second operating temperature of the interferometer.

Referring to FIG. 3a, the spectral scale of the interferometer 100 may be determined by scanning the transmission peak $P_{FP,k}$ of the interferometer 100 over the spectrum $C(\lambda)$ of the filtered light LB2. The spectral scale of the interferometer 100 may be determined by scanning the transmission peak $P_{FP,k}$ of the interferometer 100 over the spectral notch NC2 of the spectrum $C(\lambda)$. The spectral scale may be determined and/or verified by scanning the transmission peak $P_{FP,k}$ of the interferometer 100 over the spectrum $C(\lambda)$ of the filtered light LB2. The filtered light LB2 may be provided e.g. by filtering broadband light LB1 with the notch filter 60.

During the scanning, the mirror gap $d_{FP}$ of the interferometer 100 may be varied such that the control signal $S_d$ is indicative of the mirror gap $d_{FP}$. In particular, the mirror gap $d_{FP}$ may be varied according to the control signal $S_d$. For example, the mirror gap $d_{FP}$ may be adjusted by converting the control signal $S_d$ into driving voltage, which is coupled to the actuator 140 of the interferometer 100. Alternatively, the mirror gap $d_{FP}$ may be monitored e.g. by a capacitive sensor 150, which may be utilized to provide the control signal $S_d$ (FIG. 7).

The combined transmittance of notch filter 60 and the Fabry-Perot interferometer 100 may be proportional to the intensity $I_3$ of light LB3 impinging on the detector DET1. The combined transmittance may be analyzed by monitoring the intensity $I_3$ of light LB3 impinging on the detector DET1. The detector signal $S_{DET1}$ of the detector DET1 may be indicative of the intensity $I_3$ of light LB3 impinging on the detector DET1.

The mirror gap $d_{FP}$ may be varied and the detector signal $S_{DET1}$ may be analyzed in order to determine a first control signal value $S_{N1}$ associated with a first mirror gap $d_{FP}$ when the transmission peak $P_{FP,k}$ of the interferometer 100 substantially coincides with a first edge of the filtered notch NC2.

The mirror gap $d_{FP}$ may be varied and the detector signal $S_{DET1}$ may be analyzed in order to determine a second control signal value $S_{N2}$ associated with a second mirror gap $d_{FP}$ when the transmission peak $P_{FP,k}$ of the interferometer 100 substantially coincides with a second edge of the filtered notch NC2.

The spectral position $\lambda_{N1}$ and the first control signal value $S_{N1}$ may be associated to form a first pair $(\lambda_{N1},S_{N1})$. The spectral position $\lambda_{N2}$ and the second control signal value $S_{N2}$ may be associated to form a second pair $(\lambda_{N2},S_{N2})$. Spectral calibration data $S_{cal,d}(\lambda)$ of the interferometer (100) may be determined and/or verified by using the first pair $(\lambda_{N1},S_{N1})$ and the second pair $(\lambda_{N2},S_{N2})$. Further pairs $(\lambda_{CUT1},S_{C1})$, $(\lambda_{CUT2},S_{C2})$, . . . may be formed based on the spectral positions of the edges of the detection band $\Delta\lambda_{PB}$. The spectral calibration data $S_{cal,d}(\lambda)$ of the interferometer (100) may be determined and/or verified also by using the further pairs $(\lambda_{CUT1},S_{C1})$, $(\lambda_{CUT2},S_{C2})$.

In an embodiment, the calibration function may depend on the operating temperature of the interferometer 100. The spectral calibration data $S_{cal,d}(\lambda)$ may be determined for different operating temperatures of the interferometer 100. First spectral calibration data $S_{cal,d,T1}(\lambda)$ may be determined for use at a first operating temperature T1 of the interferometer 100. Second spectral calibration data $S_{cal,d,T2}(\lambda)$ may be determined for use at a second operating temperature T2 of the interferometer 100.

In an embodiment, the spectrometer 500 may be arranged to operate such that the operating temperature $T_{op}$ of the notch filter is close to the operating temperature of the interferometer 100. The difference between the operating temperature $T_{op}$ of the notch filter 60 and the operating temperature of the interferometer 100 may be kept e.g. smaller than 3° C. during operation of the spectrometer 500. The spectrometer 500 may optionally comprise a temperature sensor for monitoring the operating temperature of the interferometer 100. The spectrometer 500 may optionally comprise a temperature sensor 61 for monitoring the operating temperature $T_{op}$ of the notch filter 60.

In an embodiment, the operating temperature $T_{op}$ of the notch filter 60 may substantially deviate from the operating temperature of the interferometer 100. In that case, the spectral positions may be determined from the control signal values $S_d$ by taking into account the operating temperature $T_{op}$ of the notch filter 60. The calibration function $\lambda_{cal}(S_d)$ may depend on the operating temperature $T_{op}$ of the notch filter 60. The operating temperature $T_{op}$ of the notch filter 60 may be an input variable of the calibration function $\lambda_{cal}(S_d)$.

The calibration function $\lambda_{cal}(S_d)$ may be determined by monitoring the operating temperature $T_{op}$ of the notch filter 60, and by calculating the temperature-induced spectral shift of the spectral positions $\lambda_{N1}$, $\lambda_{N2}$ from the operating temperature $T_{op}$ of the notch filter 60. Consequently, a first calibration function $\lambda_{cal}(S_d)$ determined for a first operating temperature $T_{op}$ of the notch filter may be different from a second calibration function $\lambda_{cal}(S_d)$ determined for a second operating temperature $T_{op}$ of the notch filter.

The method may comprise determining first spectral calibration data $\lambda_{cal}(S_d)$ at a first operating temperature $T_{op}$ of the notch filter (60), and determining second spectral calibration data $\lambda_{cal}(S_d)$ at a second operating temperature $T_{op}$ of the notch filter (60), wherein the second spectral calibration data may be different from the first spectral calibration data.

Spectral deviations caused by a change of temperature may be larger at the shorter wavelengths of the detection band $\Delta\lambda_{PB}$ than at the longer wavelengths of the detection band $\Delta\lambda_{PB}$. The transmittance notch NC1 may be positioned e.g. substantially in the middle of the detection band $\Delta\lambda_{PB}$ or at the shorter wavelengths of the detection band $\Delta\lambda_{PB}$. The difference between the wavelengths $\lambda_{N1}$ and $\lambda_{CUT1}$ may be e.g. in the range of 5% to 50% of the spectral width of the detection band $\Delta\lambda_{PB}$.

Figure 3B:
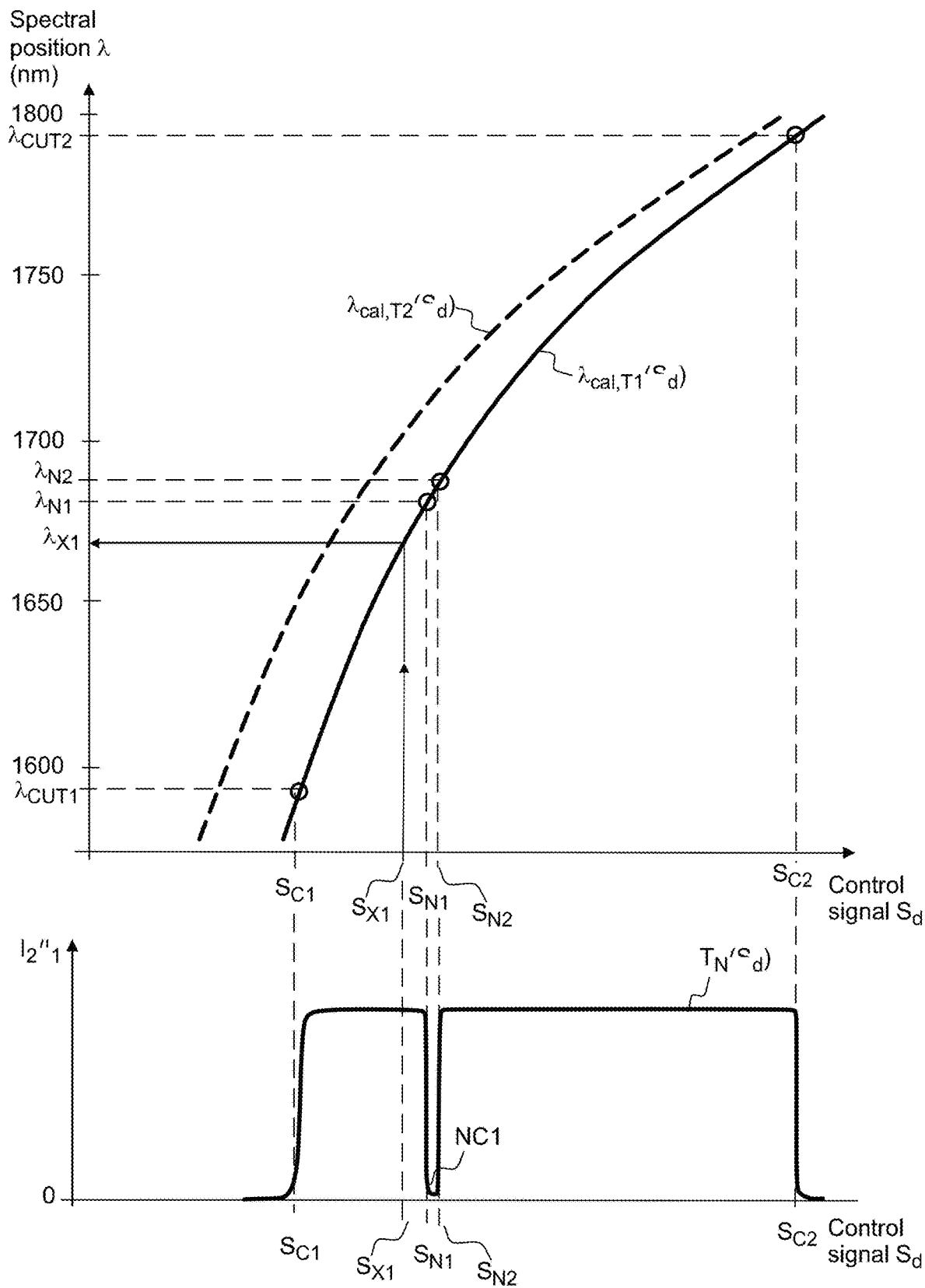
FIG. 3b shows, by way of example, the relationship between control signal values and spectral positions at a first operating temperature of the interferometer and at a second operating temperature of the interferometer.

The relationship between the spectral positions λ and the corresponding control signal values $S_d(\lambda)$ may be expressed e.g. by a calibration function $\lambda_{cal}(S_d)$ and/or by a calibration function $S_{cal,d}(\lambda)$. The calibration function $S_{cal,d}(\lambda)$ may be the inverse function of the calibration $\lambda_{cal}(S_d)$. The function $S_{cal,d}(\lambda)$ may also be called e.g. as the marker signal function. Examples of the function $S_{cal,d}(\lambda)$ are shown in FIG. 3a, and examples of the function $\lambda_{cal}(S_d)$ are shown in FIG. 3b.

The calibration function $\lambda_{cal}(S_d)$ and/or $S_{cal,d}(\lambda)$ may be determined e.g. by fitting a regression function to a plurality of data points. The calibration function $\lambda_{cal}(S_d)$ and/or $S_{cal,d}(\lambda)$ may be e.g. a polynomial function. The calibration function $\lambda_{cal}(S_d)$ may be e.g. a third order polynomial function. The calibration function $\lambda_{cal}(S_d)$ and/or $S_{cal,d}(\lambda)$ may be verified e.g. by fitting a regression function to the data pair $(\lambda_{N1}, S_{N1})$. The calibration function $\lambda_{cal}(S_d)$ and/or $S_{cal,d}(\lambda)$ may be determined and/or verified e.g. by fitting a regression function to the data pairs $(\lambda_{N1}, S_{N1})$, $(\lambda_{N2}, S_{N2})$, $(\lambda_{CUT1}, S_{C1})$, $(\lambda_{CUT2}, S_{C2})$.

In an embodiment, the notch filter 60 may enable on-line stabilization of the Fabry-Perot interferometer even when utilizing only one edge of the spectral notch NC2. In that case, the calibration function $\lambda_{cal}(S_d)$ and/or $S_{cal,d}(\lambda)$ may be determined e.g. by fitting a regression function to a single data point $(\lambda_{N1}, S_{N1})$ or $(\lambda_{N2}, S_{N2})$.

The spectral position $\lambda_{X1}$ corresponding to a value $S_{X1}$ of the control signal $S_d$ may be determined by using the calibration function $\lambda_{cal}(S_d)$. For example, the maximum value $M_{MAX}$ of the measured distribution $M(S_d)$ may be attained when the control signal $S_d$ is equal to the value $S_{X1}$. The accurate spectral position $\lambda_{X1}$ of the peak of the input spectrum $B(\lambda)$ may be determined from the control signal value $S_{X1}$ by using the calibration function $\lambda_{cal}(S_d)$, which has been determined and/or verified by using the spectral notch NC2.

Referring back to FIG. 2e, an arbitrary control signal value $S_{X2}$ may be associated with a detector signal value $M(S_{X2})$. The spectral position $\lambda_{X2}$ corresponding to a value $S_{X2}$ of the control signal $S_d$ may be determined by using the calibration function $\lambda_{cal}(S_d)$. Consequently, a detector signal value $M(S_{X2})$ of a measured distribution $M(S_d)$ may be associated with the corresponding spectral position $\lambda_{X2}$ by using the calibration function $\lambda_{cal}(S_d)$ where $S_d = S_{X2}$. $I_1(\lambda_{X2})$ denotes the intensity of input light LB1 at the spectral position $\lambda_{X2}$. $I_2(\lambda_{X2})$ denotes the intensity of filtered light LB2 at the spectral position $\lambda_{X2}$.

The control signal values $S_{X1}$, $S_{X2}$ may be different from the marker values $S_{C1}$, $S_{N1}$, $S_{N2}$, and $S_{C2}$.

Calibration data defining the calibration function $\lambda_{cal}(S_d)$ may be stored in a memory MEM3 of the spectrometer 500 and/or in a memory of a database server. The calibration data may comprise e.g. a look-up-table, which corresponds to the calibration function $\lambda_{cal}(S_d)$. The calibration data may comprise e.g. parameters, which define a polynomial calibration function $\lambda_{cal}(S_d)$.

When needed, the calibration data may be retrieved from the memory. The calibration data may be used for determining the spectral scale for a measured spectrum. The calibration data may be determined and/or verified. The determined calibration data may be optionally stored in a memory MEM3 of the spectrometer 500 and/or in a memory of a database server. The calibration data may be determined by modifying previous calibration data. Modified calibration data may be optionally stored in a memory MEM3 of the spectrometer 500 and/or in a memory of a database server, again.

A first calibration function $\lambda_{cal,T1}(S_d)$ may be determined for use at a first operating temperature T1 of the interferometer 100. A second calibration function $\lambda_{cal,T2}(S_d)$ may be determined for use at a second operating temperature T2 of the interferometer 100.

Using the first calibration function $\lambda_{cal,T1}(S_d)$ for control signal values $S_d$ measured at the second operating temperature T2 may cause a spectral error $\Delta\lambda$.

The measured distribution $M(S_d)$ may be compared with the spectral transmittance $T_N(\lambda)$ of the notch filter 60 by using cross-correlation analysis. Matching the distribution $M(S_d)$ with the transmittance $T_N(\lambda)$ may be performed by using cross-correlation. The calibration function $\lambda_{cal}(S_d)$ and/or $S_{d,cal}(\lambda)$ may be determined by correlation analysis. The distribution $M(S_d)$ may indicate intensity values as the function of control signal $S_d$. A calibrated distribution $M(S_{d,cal}(\lambda))$ may be determined from the measured distribution $M(S_d)$ by using the calibration function $S_{d,cal}(\lambda)$. The calibrated distribution $M(S_{d,cal}(\lambda))$ may provide intensity values as the function of spectral position $\lambda$.

The calibration function $S_{d,cal}(\lambda)$ may be a regression function, which has one or more adjustable parameters. For example, the calibration function $S_{d,cal}(\lambda)$ may be a polynomial function, and the adjustable parameters may be the coefficients of the terms of the polynomial function.

The cross-correlation of the calibrated distribution $M(S_{d,cal}(\lambda))$ with the transmittance function $T_N(\lambda)$ may provide a value, which indicates the degree of similarity between the calibrated distribution $M(S_{d,cal}(\lambda))$ and the transmittance function $T_N(\lambda)$. The calibration function $\lambda_{cal}(S_d)$ and/or $S_{d,cal}(\lambda)$ may be determined by adjusting one or more parameters of the regression function $S_{d,cal}(\lambda)$, and calculating the cross-correlation of the calibrated distribution $M(S_{d,cal}(\lambda))$ with the transmittance function $T_N(\lambda)$. One or more parameters of the regression function may be adjusted until the cross-correlation of the calibrated distribution $M(S_{d,cal}(\lambda))$ with the transmittance function $T_N(\lambda)$ reaches a maximum value. The cross-correlation may reach a maximum value when the spectral position of the notch NC2' of the calibrated distribution $M(S_{d,cal}(\lambda))$ substantially coincides with the notch NC1 of the transmittance function $T_N(\lambda)$.

An auxiliary transmittance function $T_N(\lambda_{cal}(S_d))$ of the notch filter 60 may give the transmittance of the notch filter 60 as the function of control signal $S_d$. The calibration function $\lambda_{cal}(S_d)$ may be expressed as a regression function, which has one or more adjustable parameters. One or more parameters of the regression function may be adjusted until the cross-correlation of the measured distribution $M(S_d)$ with the auxiliary transmittance function $T_N(\lambda_{cal}(S_d))$ reaches a maximum value.

The method may comprise:
  providing a regression function $S_{d,cal}(\lambda)$ or $(\lambda_{cal}(S_d))$,
  determining a calibrated spectral intensity distribution $(M(S_{d,cal}(\lambda)))$ from the measured spectral intensity distribution $(M(S_d))$ by using the regression function, and
  determining one or more parameters of the regression function $(S_{d,cal}(\lambda))$ such that the cross-correlation of the calibrated spectral intensity distribution $(M(S_{d,cal}(\lambda)))$ with the spectral transmittance $(T_{E,MAX})$ of the notch filter 60 reaches a maximum value.

The method may comprise:
  providing a regression function $S_{d,cal}(\lambda)$ or $(\lambda_{cal}(S_d))$,
  determining an auxiliary transmittance $(T_N(\lambda_{cal}(S_d)))$ from the spectral transmittance $(T_N(\lambda))$ of the notch filter 60 by using the regression function, and determining one or more parameters of the regression function ($\lambda_{cal}(S_d)$) such that the cross-correlation of the distribution ($M(S_d)$) with the auxiliary transmittance ($T_N(\lambda_{cal}(S_d))$) reaches a maximum value.

In an embodiment, the accuracy of the calibration function $\lambda_{cal}(S_d)$ and/or $S_{d,cal}(\lambda)$ may be verified by checking whether the maximum value of the cross-correlation is higher than or equal to a predetermined limit. If the maximum value of the cross-correlation is lower than the predetermined limit, this may be an indication that the calibration function is not valid.

Figure 4A:
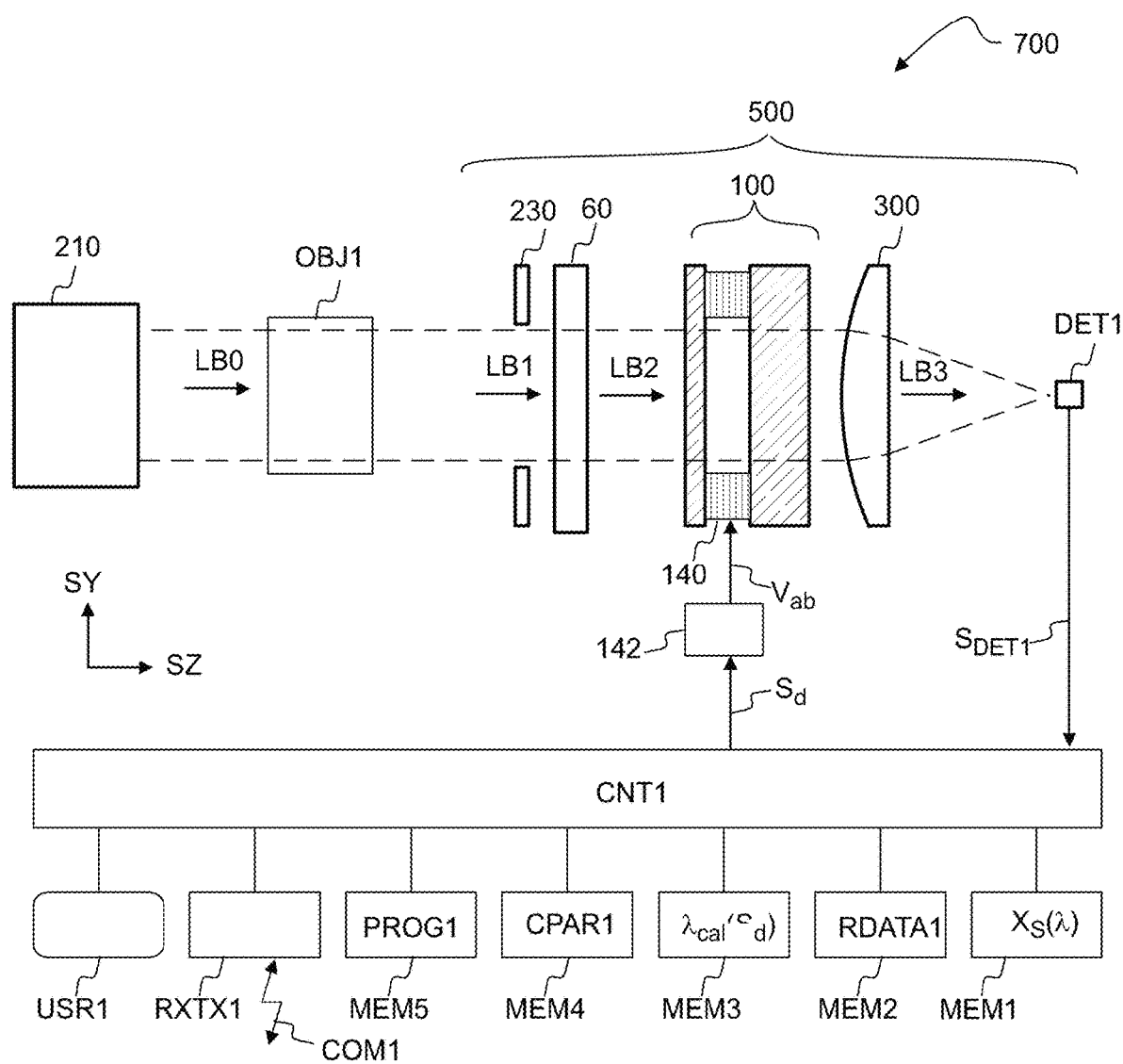
FIG. 4a shows, by way of example, a measurement system, which comprises a light source, and a spectrometer.

FIG. 4a shows an apparatus 700 suitable for absorption or reflection measurements. The apparatus 700 may comprise a spectrometer 500 and a light source unit 210. The light source unit 210 may provide illuminating light LB0. The apparatus 700 may be arranged to analyze an object OBJ1. The object OBJ1 may be e.g. an amount of chemical substance contained in a cuvette. The object OBJ1 may be a sample. The object OBJ1 may be e.g. a piece of material. The light source unit 210 may be arranged to illuminate the object OBJ1. The spectrometer 500 may be arranged to receive light LB1 transmitted through the object OBJ1 and/or to receive light LB1 reflected from the object OBJ1. The apparatus 700 may comprise a notch filter 60. The apparatus may further comprise the units 60, 100, 300, DET1, CNT1, MEM1, MEM2, MEM3, MEM4, MEM5, RXTX1, USR1. The units 60, 100, 300, DET1, CNT1, MEM1, MEM2, MEM3, MEM4, MEM5, RXTX1, USR1 may operate in a similar manner as described in the other parts of this description.

Figure 4B:
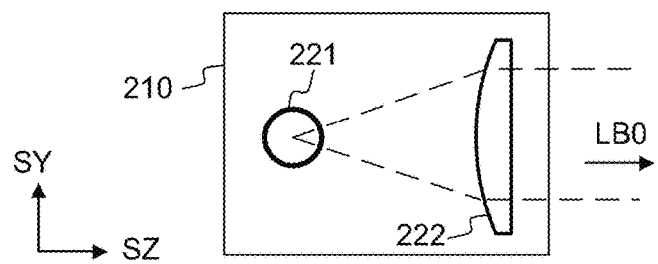
FIG. 4b shows, by way of example, a light source for the measurement system.

Referring to FIG. 4b, the light source unit 210 may comprise a light source 221, and optionally a light-directing element 222. The light source 221 may comprise e.g. an incandescent lamp, a blackbody radiator, an infrared light emitting glow-bar, a tungsten halogen lamp, a fluorescent lamp, or a light emitting diode. The light-directing element 222 may comprise e.g. a lens or a paraboloid reflector. The light source unit 210 may be arranged provide illuminating light LB0. The illuminating light LB0 may have a broad spectrum. In an embodiment, the illuminating light LB0 may have a broadband spectrum which is substantially continuous at least in the spectral range from $\lambda_{CUT1}$ to $\lambda_{CUT2}$.

Figure 5A:
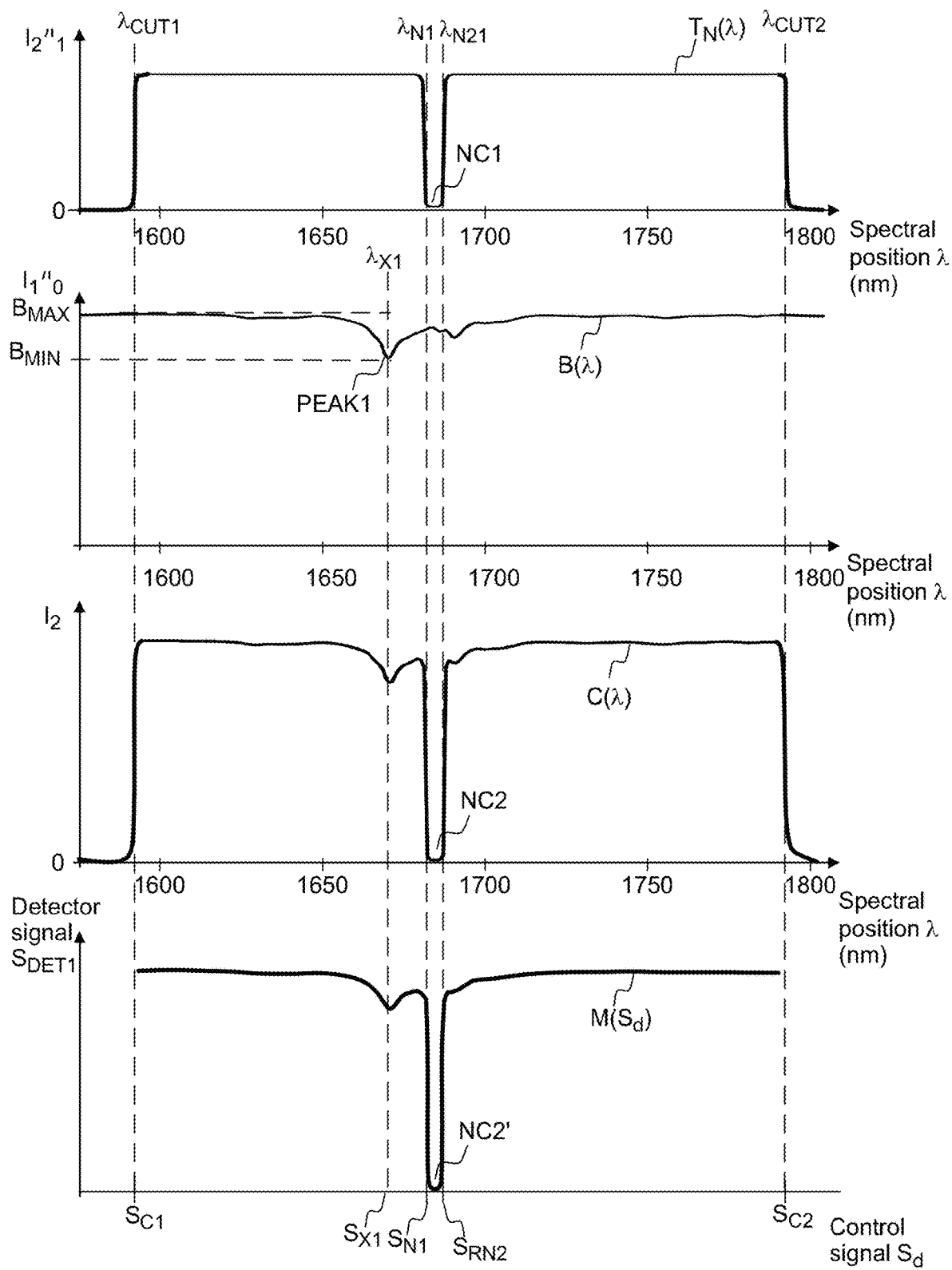
FIG. 5a shows, by way of example, forming a filtered spectrum by using the notch filter.

FIG. 5a illustrates filtering of light by the notch filter 60 in case of an absorption (or reflectance) measurement. Input light LB1 impinging on the filter 60 may have an input spectrum $B(\lambda)$, and filtered light LB2 transmitted through the filter 60 may have a filtered spectrum $C(\lambda)$. The filter 60 may provide the filtered light LB2 by filtering the input light LB1. The filtered spectrum $C(\lambda)$ may be obtained by multiplying the input spectrum $B(\lambda)$ with the transmittance $T_N(\lambda)$ of the notch filter 60 (see equation 1).

The uppermost curve of FIG. 5a shows the spectral transmittance $T_N(\lambda)$ of the filter 50. The second curve from the top of FIG. 5a shows an input spectrum $B(\lambda)$. The input spectrum $B(\lambda)$ may be e.g. an absorption spectrum or a reflectance spectrum. The third curve from the top of FIG. 5a shows a filtered spectrum $C(\lambda)$, which is formed by filtering the input spectrum $B(\lambda)$ with the notch filter 60.

Figure 5B:
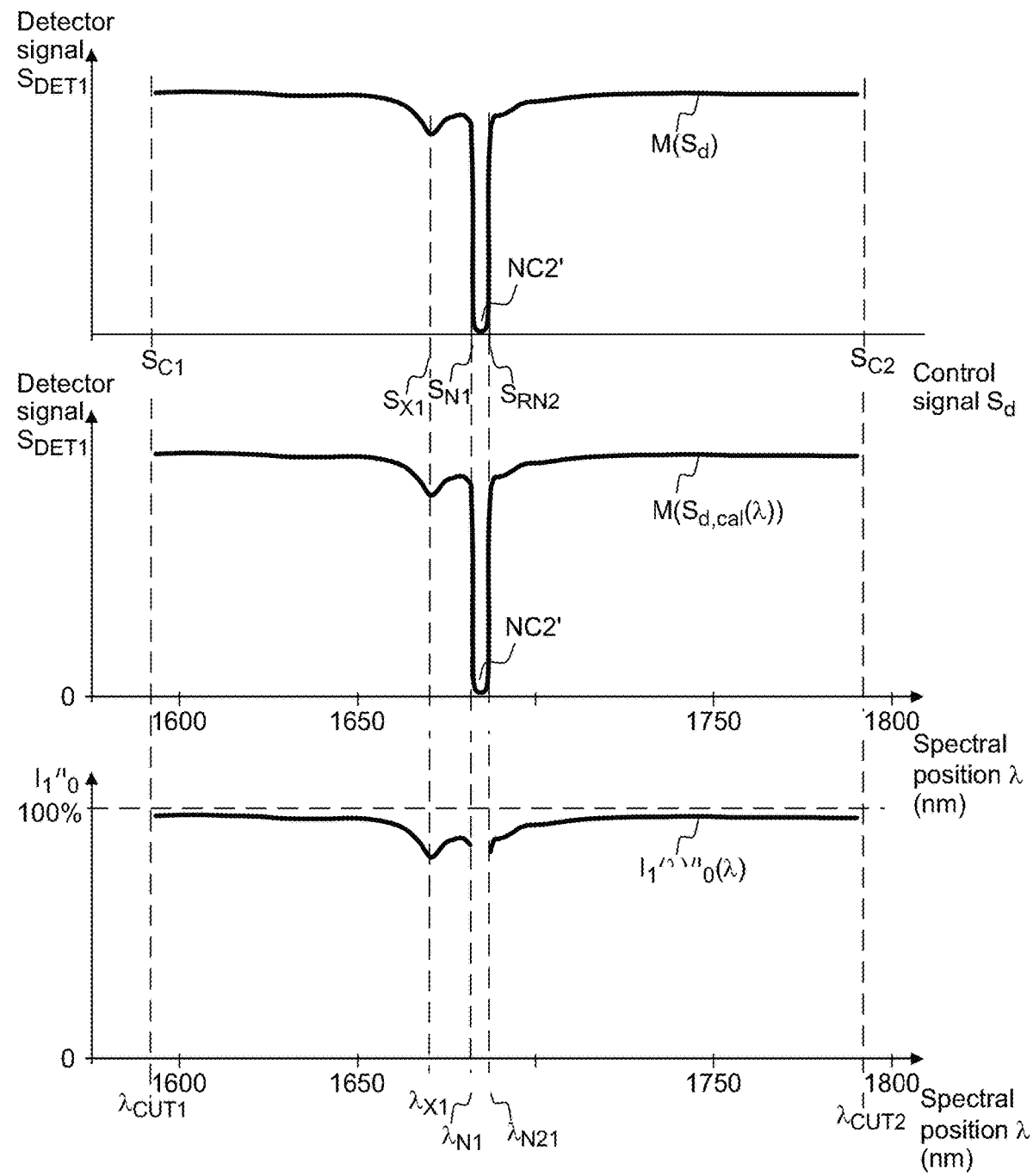
FIG. 5b shows, by way of example, obtaining a calibrated absorption spectrum from the measured distribution of FIG. 5a, FIG. 6 shows, by way of example, a monolithic Fabry-Perot interferometer.

The lowermost curve of FIG. 5b shows a measured spectral intensity distribution $M(S_d)$. The distribution $M(S_d)$ may be measured by scanning over the filtered spectrum $C(\lambda)$. The spectral position of the transmission peak $P_{FP,k}$ of the Fabry-Perot interferometer 100 may be scanned by varying the mirror gap $d_{FP}$. The control signal $S_d$ may be provided such that the control signal $S_d$ is indicative of the mirror gap $d_{FP}$. The spectral position of the transmission peak $P_{FP,k}$ of the Fabry-Perot interferometer 100 may be scanned by varying the value of the control signal $S_d$. The detector signal $S_{DET1}$ may be monitored as the function of the control signal $S_d$ in order to detect the edges of the notch NC2, NC2'.

The measured distribution may be expressed as a function $M(S_d)$ of the control signal $S_d$. The calibration function $\lambda_{cal}(S_d)$ may be determined and/or verified by comparing the measured distribution $M(S_d)$ with the transmittance function $T_N(\lambda)$. The calibration function $\lambda_{cal}(S_d)$ may be determined and/or checked by using marker values $S_{N1}$, $S_{N2}$, $S_{C1}$, ... of the measured distribution $M(S_d)$ and by using the accurately known wavelengths $\lambda_{N1}$, $\lambda_{N2}$, $\lambda_{CUT1}$, $\lambda_{CUT2}$ of the transmittance function $T_N(\lambda)$.

FIG. 5b shows forming a measured absorption spectrum $I_1(\lambda)/I_0(\lambda)$ from the measured spectral intensity distribution $M(S_d)$ of FIG. 5a. The uppermost curve of FIG. 5b shows the measured spectral intensity distribution $M(S_d)$, which may be obtained by varying the mirror gap $d_{FP}$, and by recording the detector signal values $S_{DET1}$ as the function of the control signal $S_d$. The second curve from the top of FIG. 5b shows a calibrated spectral intensity distribution $M(S_{d,cal}(\lambda))$ determined from the measured spectral intensity distribution $M(S_d)$ by using the calibration function $\lambda_{cal}(S_d)$ and/or $S_{d,cal}(\lambda)$.

If desired, a calibrated measured spectrum $X_S(\lambda)$ may be optionally obtained by using the intensity calibration data CPAR1 to convert detector signal values to calibrated intensity values. The calibrated measured spectrum $X_S(\lambda)$ may represent the spectrum of light transmitted through the object OBJ1 or the spectrum of light reflected by the object OBJ1.

A reference distribution $M_{REF}(S_{d,cal}(\lambda))$ may be obtained by measuring the spectral intensity distribution without the absorbing sample OBJ1. The reference distribution $M_{REF}(S_{d,cal}(\lambda))$ may represent the spectrum of the illuminating light LB0. The reference distribution $M_{REF}(S_{d,cal}(\lambda))$ may be stored e.g. in the memory MEM4 of the apparatus 700. The measured absorption spectrum $I_1(\lambda)/I_0(\lambda)$ may be determined from the calibrated spectral intensity distribution $M(S_{d,cal}(\lambda))$ by using the reference distribution $M_{REF}(S_{d,cal}(\lambda))$. The measured absorption spectrum $I_1(\lambda)/I_0(\lambda)$ may be determined by dividing the reference distribution $M_{REF}(S_{d,cal}(\lambda))$ with the spectral intensity distribution $M(S_{d,cal}(\lambda))$.

FIG. 6 shows, by way of example, an interferometer 100 where the optical cavity has been formed by etching. The spectrometer 500 may comprise the interferometer shown in FIG. 6. The spectrometer 500 may comprise an interferometer 100 where the optical cavity has been formed by etching. The spectrometer 500 may comprise an interferometer 100 where an empty space ESPACE1 between the mirrors 110, 120 has been formed by etching, after the material layers of the mirrors 110, 120 have been formed.

The spacer 115 may be deposited on top of the mirror 120, two or more material layers of the mirror 110 may be deposited top of the spacer 115, and the empty space (ESPACE1) between the mirrors 110, 120 may be formed by etching material away from between the mirrors 110, 120 after the two or more material layers of the mirror 110 have been deposited.

The first mirror 110 may have a movable portion MPOR1, and the first mirror 110 may be called e.g. as the movable mirror. The movable portion MPOR1 of the movable mirror 110 may be moved with respect to the stationary mirror 120 in order to adjust the mirror gap $d_{FP}$. The second mirror 120 may be called e.g. as the stationary mirror.

The stationary mirror 120 may comprise a plurality of material layers supported by substrate 130. The movable mirror 110 may be supported by a spacer layer 115. The spacer layer 115 may be formed on top of the stationary mirror 120, and the movable mirror 110 may be supported by the spacer layer 115. The movable mirror 110 may comprise e.g. material layers 110a, 110b, 110c, 110d, and/or 110e. The stationary mirror 120 may comprise e.g. material layers 120a, 120b, 120c, 120d, and/or 120e. The mirrors 110, 120 may comprise reflective multilayer coatings. The mirrors 110, 120 may be implemented by using reflective multilayer coatings.

The material layers of the stationary mirror 120 may be formed e.g. by depositing material on top of a substrate 130 and/or by locally converting material of the substrate 130. The spacer layer 115 may be deposited on top of the stationary mirror 120 after the material layers of the stationary mirror 120 have been formed. The material layers of the movable portion MPOR1 may be formed after the spacer layer 115 has been deposited, by depositing material layers of the movable mirror 110 on top of the spacer layer 115. The material layers of the mirrors 110, 120 may be e.g. e.g. silicon-rich silicon nitride, polycrystalline silicon, doped polycrystalline silicon, silicon oxide and/or aluminum oxide. The layers may be deposited e.g. by using a LPCVD process. LPCVD means low pressure chemical vapor deposition. The substrate 130 may be e.g. monocrystalline silicon or fused silica. The spacer layer 115 may comprise e.g. silicon dioxide. The spacer layer 115 may consist essentially of silicon dioxide.

The empty space ESPACE1 between the mirrors 110, 120 of the interferometer 100 may be formed by etching. The material of the spacer layer 115 may etched away e.g. by using hydrofluoric acid (HF). The mirror 110 may comprise a plurality of miniature holes H1 for guiding hydrofluoric acid (HF) into the space between the mirrors 110, 120 and for removing the material of the spacer layer 115. The width of the holes H1 may be so small that they do not significantly degrade the optical properties of the interferometer 100.

The movable portion MPOR1 may be moved e.g. by an electrostatic actuator 140. The electrostatic actuator 140 may comprise two or more electrodes Ga, Gb. A first electrode Ga may have a voltage Va, and a second electrode Gb may have a voltage Vb. The electrodes Ga, Gb may generate an attractive electrostatic force F1 when a voltage difference Va−Vb is applied between the electrodes Ga, Gb. The electrostatic force F1 may pull the movable portion MPOR1 towards the stationary mirror 120.

The electrostatic actuator 140 may be implemented as a rugged, shock-proof, miniature, stable and/or low-cost structure. Thanks to using the notch filter for spectral stabilization, an interferometer 100 having the electrostatic actuator 140 may also be implemented without using a capacitive sensor for monitoring the mirror gap.

The voltage Va may applied to the electrode Ga by using a conductor CON1 and a terminal N1. The voltage Vb may applied to the electrode Gb by using a conductor CON2 and a terminal N2. The voltages Va, Vb may be provided by a voltage supply, which may be controlled by the control unit CNT1. The voltages Va, Vb may be provided according to the control signal $S_d$. The terminals N1, N2 may be e.g. metallic, and the conductors CON1, CON2 may be e.g. bonded to the terminals N1, N2.

The aperture portion AP1 of the movable portion MPOR1 may have a width w1. The aperture portion AP1 of the movable mirror 110 may be highly planar in order to provide sufficient spectral resolution. The magnitude of electrostatic forces directly acting on the aperture portion AP1 may be kept low in order to preserve the planar shape of the aperture portion AP1. The attractive force F1 may be generated by a substantially annular electrode Gb, which surrounds the aperture portion AP2 of the stationary mirror 120. The mirror 120 may optionally comprise a neutralizing electrode Gc, which may be arranged to reduce deformation of the aperture portion AP1 of the movable mirror 110. The neutralizing electrode Gc may be substantially opposite the aperture portion AP1 of the movable mirror 110. The voltage of the neutralizing electrode Gc may be kept substantially equal to the voltage Va of the electrode Ga, in order to reduce deformation of the aperture portion AP1 of the movable mirror 110. The voltage difference between the electrodes Ga and Gc may be kept smaller than a predetermined limit in order to reduce deformation of the aperture portion AP1 of the movable mirror 110. In an embodiment, the neutralizing electrode Gc may be galvanically connected to the electrode Ga e.g. by using a connecting portion N1b. The annular electrode Gb may be positioned around the neutralizing electrode Gc. The electrodes Ga and Gc may be substantially transparent at the operating spectral region of the interferometer 100. For example, the electrodes Ga, Gb and Gc may comprise doped polycrystalline silicon, which may be substantially transparent for infrared light LB3.

The electrodes Ga, Gb may generate an attractive electrostatic force F1 when a driving voltage $V_{ab}$ is coupled to the electrodes Ga, Gb. The driving voltage $V_{ab}$ may be equal to the voltage difference $V_a-V_b$. The voltage may be coupled to the electrodes Ga, Gb e.g. via the conductors CON1, CON2 and the terminals N1, N2. The mirror 110 may be flexible and/or the spacer 115 may be mechanically compressible such that the mirror gap $d_{FP}$ may be changed by changing the magnitude of the electrostatic force F1. The magnitude of the electrostatic force F1 may be changed by changing the driving voltage $V_a-V_b$ (=$V_{ab}$).

Coupling a first driving voltage $V_{ab}$ to the electrodes Ga, Gb may cause adjusting the transmission peak $P_{FP,k}$ of the interferometer 100 to a first spectral position (e.g. to the position $\lambda_{P1}$), and coupling a second different driving voltage $V_{ab}$ to the electrodes Ga, Gb may cause adjusting the transmission peak $P_{FP,k}$ of the interferometer 100 to a second different spectral position (e.g. to the position $\lambda_{P2}$).

During normal operation, the space ESPACE1 between the mirrors 110, 120 may be filled with a gas. However, the interferometer 100 may also be operated in vacuum, and the pressure in the space ESPACE1 may be low.

The interferometer 100 produced by depositing and etching may be considered to have a substantially monolithic structure. Said interferometer 100 may be e.g. shock resistant and small. The mass of the moving portion MPOR1 may be small, and the interferometer 100 may have a high scanning speed.

Referring to FIG. 7, the spectrometer 500 may comprise an interferometer 100, which has a distance sensor 150 for monitoring the mirror gap $d_{FP}$. The distance sensor 150 may be e.g. a capacitive sensor, which comprises two or more capacitor plates G1, G2. A first capacitor plate G1 may be attached to the first mirror 110, and a second capacitor plate G2 may be attached to the second mirror 120 so that the distance between the plates G1, G2 depends on the mirror gap $d_{FP}$. The capacitor plates G1, G2 may together form a capacitor, which has a capacitance $C_x$ such that the capacitance $C_x$ may depend on the mirror gap $d_{FP}$. The capacitance value $C_x$ may be indicative of the mirror gap $d_{FP}$. The capacitor plates G1, G2 may be connected to a capacitance monitoring unit 152 e.g. by conductors CONa, CONb. The capacitance monitoring unit 152 may provide a signal $S_d$ indicative of the capacitance $C_x$ of the sensor 150. The capacitance monitoring unit 152 may provide a signal $S_d$ indicative of the mirror gap $d_{FP}$.

The capacitance monitoring unit 152 may be arranged to measure the capacitance $C_x$ e.g. by charging the capacitive sensor 150 with a predetermined current, and measuring the time needed to charge the sensor 150 to a predetermined voltage. The capacitance monitoring unit 152 may be arranged to measure the capacitance $C_x$ e.g. by coupling the capacitive sensor 150 as a part of a resonance circuit, and measuring the resonance frequency of the resonance circuit. The capacitance monitoring unit 152 may be arranged to measure the capacitance $C_x$ e.g. by using the capacitive sensor 150 to repetitively transfer charge to a tank capacitor, and counting the number of charge transfer cycles needed to reach a predetermined tank capacitor voltage.

The interferometer 100 may comprise a driver unit 142. The driver unit 142 may e.g. convert a digital driving signal $S_{140}$ into an analog signal suitable for driving the actuator 140. The driver unit 142 may provide e.g. a voltage signal $V_{ab}$ for driving an electrostatic actuator 140, or for driving a piezoelectric actuator 140.

In an embodiment, the control unit CNT1 may be configured to provide a digital driving signal $S_{140}$ for changing the mirror gap $d_{FP}$, and the control unit CNT1 may be arranged to receive the control signal $S_d$ indicative of the mirror gap $d_{FP}$.

The spectrometer 500 may be implemented e.g. in a first mobile unit. Determining spectral positions λ from the control signal values $S_d$ may be carried out in the first mobile unit. The spectral positions may be expressed e.g. in terms of wavelengths or wavenumbers. Determining spectral positions λ from the control signal values $S_d$ may be carried out in a second mobile or in stationary unit, which is separate from the first unit. The stationary unit may be implemented e.g. in a server, which may be accessed via the Internet.

The spectrometer 500 may be used e.g. for remote sensing applications. The spectrometer 500 may be used e.g. for measuring the color of an object OBJ1. The spectrometer 500 may be used e.g. for an absorption measurement, where the transmission peak of the interferometer 100 may be adjusted to a first spectral position to match with an absorption band of an object OBJ1, and the transmission peak of the interferometer 100 may be adjusted to a second spectral position to match with a reference band. The spectrometer 500 may be used e.g. for a fluorescence measurement, where the first spectral position of the transmission peak of the interferometer is matched with fluorescent light emitted from an object OBJ1, and the second spectral position is matched with the illuminating light, which induces the fluorescence.

When measuring the reflectance spectrum of an object OBJ1, the object OBJ1 may be illuminated with illuminating light. The illuminating light may have a broad spectrum. In an embodiment, the bandwidth of the illuminating light may be greater than or equal to the detection range of the spectrometer 500.

When measuring broadband light, the spectrometer may provide a filtered spectrum, which has the spectral notch NC2 at a stable spectral position. The spectral scale of the interferometer 100 may be determined and/or verified based on the spectral notch NC2. Therefore, the accuracy requirements of the scanning interferometer may become highly relaxed as the spectral positions of the edges of the notch NC2 may be detected at high accuracy.

Figure 8A:
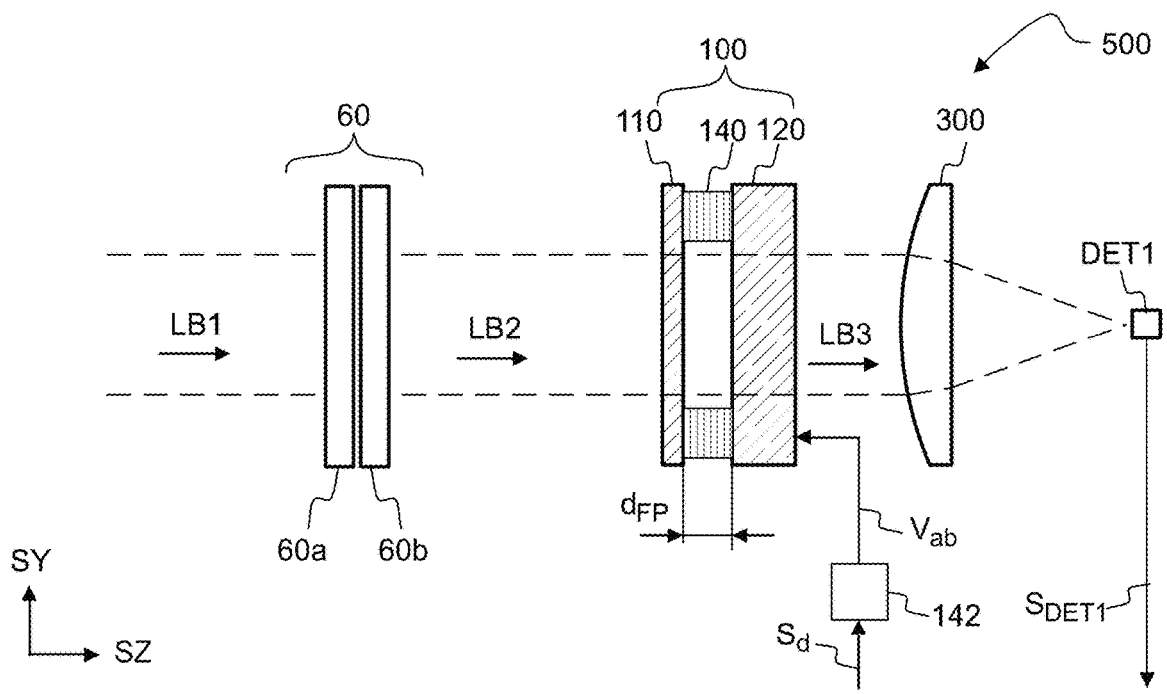
FIG. 8a shows, by way of example, stacking of two or more notch filters, and, FIG. 8b shows, by way of example, combined spectral transmittance of stacked notch filters.
Figure 8B:
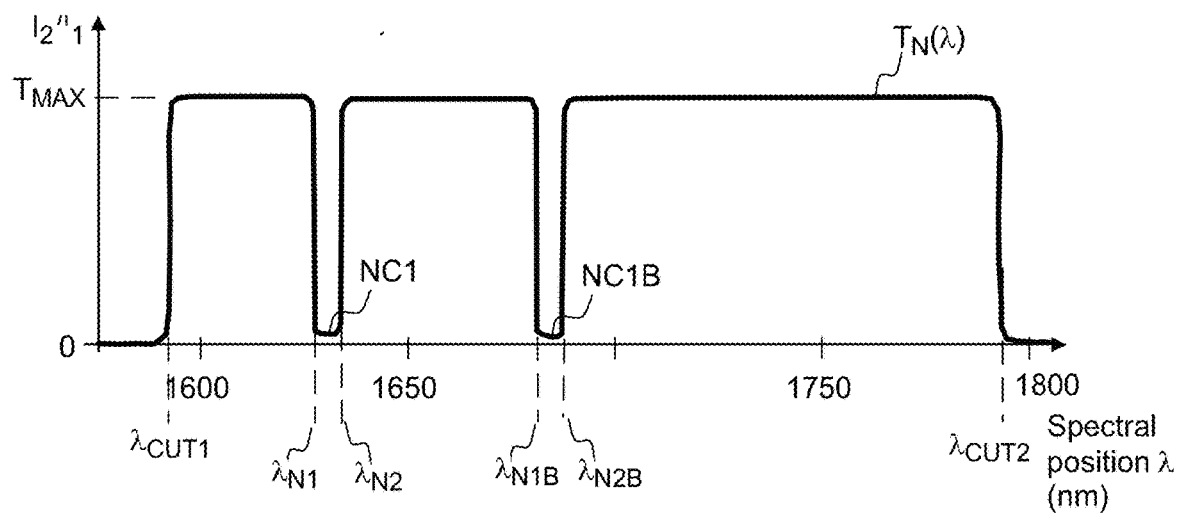

The spectral scale of the spectrometer 500 may be calibrated by using notch filter 60, which provides only one transmittance notch NC1. However, the spectrometer 500 may comprise a filter unit 60, which provides two or more transmittance notches. Referring to FIG. 8a, the filter unit 60 of the spectrometer 500 may comprise e.g. two or more notch filters 60a, 60b. referring to FIG. 8b, the filter unit 60 may provide a first transmittance notch NC1 and a second transmittance notch NC1B such that the second transmittance notch NC1B is spectrally separate from the first transmittance notch NC1. The first transmittance notch NC1 may be used for providing a first data pair $(\lambda_{N1}, S_{N1})$ as described above. The second transmittance notch NC1B may be used for providing a first auxiliary data pair $(\lambda_{N1B}, S_d(\lambda_{N1B}))$ and/or a second auxiliary data pair $(\lambda_{N2B}, S_d(\lambda_{N2B}))$. The first auxiliary data pair $(\lambda_{N1B}, S_d(\lambda_{N1B}))$ and/or a second auxiliary data pair $(\lambda_{N2B}, S_d(\lambda_{N2B}))$ may be used to further improve the accuracy of determining the spectral calibration data $\lambda_{cal}(S_d)$.

The term "light" may refer to electromagnetic radiation in the ultraviolet, visible and/or infrared regime.

In an embodiment, light may be coupled into a spectrometer by using one or more optical fibers. For example, light may be guided to the spectrometer from an optical probe by using one or more optical fibers.

A spectral position may be defined e.g. by providing a wavelength value and/or by providing a wavenumber value. The spectral scale may be defined e.g. by using wavelength values and/or by using wavenumber values.

For the person skilled in the art, it will be clear that modifications and variations of the devices and the methods according to the present invention are perceivable. The figures are schematic. The particular embodiments described above with reference to the accompanying drawings are illustrative only and not meant to limit the scope of the invention, which is defined by the appended claims.

The invention claimed is:

1. A method for determining spectral calibration data $(\lambda_{cal}(S_d), S_{d,cal}(\lambda))$ of a Fabry-Perot interferometer, the method comprising:

forming only a single spectral notch (NC2) by filtering input light (LB1) with a single notch filter in the system, such that the spectral notch corresponds to a transmittance notch (NC1) of the notch filter, and measuring a spectral intensity distribution $(M(S_d))$ of the single spectral notch (NC2) by varying a mirror gap $(d_{FP})$ of the Fabry-Perot interferometer, and by providing a control signal $(S_d)$ indicative of the mirror gap $(d_{FP})$, wherein a position of the spectral notch (NC2) is within a detection band $(\Delta\lambda_{PB})$ to be measured, and determining the spectral calibration data $(\lambda_{cal}(S_d), S_{d,cal}(\lambda))$ by matching the measured spectral intensity distribution $(M(S_d))$ with the spectral transmittance $(T_N(\lambda))$ of the notch filter, wherein the matching takes place by using at least one of: cross correlation, associating a control signal value with a predetermined spectral position, and wherein the method further comprises at least one of:

analyzing the spectral intensity distribution $M(S_d)$ in order to determine a second control signal value $(S_{C1})$ associated with a second mirror gap $(d_{FP})$ when the transmission peak $(P_{FP,k})$ of the interferometer substantially coincides with a first edge of the detection band $(\Delta\lambda_{PB})$ of the interferometer, and analyzing the spectral intensity distribution $M(S_d)$ in order to determine a third control signal value $(S_{C1})$ associated with a third mirror gap $(d_{FP})$ when the transmission peak $(P_{FP,k})$ of the interferometer substantially coincides with a second edge of the detection band $(\Delta\lambda_{PB})$ of the interferometer.

2. The method of claim 1, wherein the spectral calibration data ($\lambda_{cal}(S_d)$, $S_{d,cal}(\lambda)$) determines a relation for obtaining spectral positions ($\lambda$) of transmission peaks from values of the control signal ($S_d$).

3. The method of claim 1, further comprising:
analyzing the spectral intensity distribution $M(S_d)$ in order to determine a first control signal value ($S_{N1}$) associated with a first mirror gap ($d_{FP}$) when the transmission peak ($P_{FP,k}$) of the interferometer substantially coincides with the spectral notch (NC2),
forming a first association ($\lambda_{N1}, S_{N1}$) between the first control signal value ($S_{N1}$) and a first spectral position ($\lambda_{N1}$) of the transmittance notch (NC1), and
determining the spectral calibration data ($\lambda_{cal}(S_d)$) of the interferometer based on the first association ($\lambda_{N1}, S_{N1}$).

4. The method according to claim 1, wherein the notch filter is arranged to define the cut-off wavelengths ($\lambda_{CUT1}$, $\lambda_{CUT2}$) of the detection band ($\Delta\lambda_{PB}$) of the interferometer, wherein the notch filter is implemented using dielectric multilayer coatings.

5. The method of claim 1, further comprising determining first spectral calibration data ($\lambda_{cal}(S_d)$) at a first operating temperature ($T_{op}$) of the notch filter, and determining second spectral calibration data ($\lambda_{cal}(S_d)$) at a second operating temperature ($T_{op}$) of the notch filter, wherein the second spectral calibration data is different from the first spectral calibration data.

6. The method of claim 1, wherein spectral separation ($\lambda_{N1}-\lambda_{CUT1}$) between the spectral notch (NC2) and a shorter wavelength side of the detection band ($\Delta\lambda_{PB}$) of the interferometer is in the range of 5% to 50% of the spectral width ($\lambda_{CUT2}-\lambda_{CUT1}$) of a detection band ($\Delta\lambda_{PB}$).

7. The method according to claim 1, further comprising measuring an intensity value ($I_3, S_{DET1}$) and associating the measured intensity value ($I_3, S_{DET1}$) with a spectral position ($\lambda_{X1}$) of a transmission peak, wherein the spectral position ($\lambda_{X1}$) is determined by:

obtaining a control signal value ($S_{X1}$) associated with said intensity value ($I_3, S_{DET1}$), and
determining the spectral position ($\lambda_{X1}$) from the control signal value ($S_{X1}$) by using the spectral calibration data ($\lambda_{cal}(S_d)$).

8. The method according to claim 3, wherein the spectral calibration data ($\lambda_{cal}(S_d)$) comprises a polynomial regression function, and the value of at least one parameter of the polynomial regression function is determined based on the first association ($\lambda_{N1}, S_{N1}$).

9. The method according to claim 1, further comprising:
forming a second association ($\lambda_{CUT1}, S_{C1}$) between the second control signal value ($S_{C1}$) and the spectral position ($\lambda_{CUT1}$) of the first edge,
forming a third association ($\lambda_{CUT2}, S_{C2}$) between the third control signal value ($S_{C2}$) and the spectral position ($\lambda_{CUT2}$) of the second edge, and
determining the spectral calibration data ($\lambda_{cal}(S_d)$) based on the second association ($\lambda_{CUT1}, S_{C1}$) and based on the third association ($\lambda_{CUT2}, S_{C2}$).

10. The method according to claim 1, wherein said matching comprises using cross-correlation.

11. The method according to claim 1, wherein the Fabry-Perot interferometer comprises an electrostatic actuator, the mirror gap ($d_{FP}$) is varied by changing a driving voltage ($V_{ab}$) applied to the electrostatic actuator, and the driving voltage ($V_{ab}$) is changed according to the control signal ($S_d$).

12. The method according to claim 1, wherein the interferometer comprises a capacitive sensor (Ga, Gd) arranged to provide the control signal ($S_d$) by monitoring the mirror gap ($d_{FP}$) of the interferometer.

13. The method of claim 1, wherein the detection band ($\Delta\lambda_{PB}$) is defined by the at least one notch filter and at least one bandwidth-limiting filter.

14. The method of claim 13, wherein the notch filter and the bandwidth-limiting filter is implemented as a substantially monolithic structure.

* * * * *